US012634664B2

(12) United States Patent
Xie et al.

(10) Patent No.:  US 12,634,664 B2
(45) Date of Patent:    May 19, 2026

(54) METHOD AND APPARATUS FOR TRIGGERING NON-UNICAST SERVICE OPERATION, AND NETWORK FUNCTIONS

(71) Applicant: VIVO MOBILE COMMUNICATION CO., LTD., Guangdong (CN)

(72) Inventors: Zhenhua Xie, Guangdong (CN); Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 267 days.

(21) Appl. No.: 18/354,579

(22) Filed: Jul. 18, 2023

(65) Prior Publication Data

US 2024/0022880 A1    Jan. 18, 2024

Related U.S. Application Data

(63) Continuation of application No. PCT/CN2022/071584, filed on Jan. 12, 2022.

(30) Foreign Application Priority Data

| Jan. 19, 2021 | (CN) | ......................... 202110070319.1 |
| Jan. 29, 2021 | (CN) | ......................... 202110129381.3 |
| Feb. 4, 2021 | (CN) | ......................... 202110158954.5 |

(51) Int. Cl.
*H04W 76/10*        (2018.01)
*H04W 4/08*          (2009.01)
(Continued)

(52) U.S. Cl.
CPC ......... *H04W 4/08* (2013.01); *H04W 28/0268* (2013.01); *H04W 28/16* (2013.01); *H04W 76/10* (2018.02)

(58) Field of Classification Search
CPC ................................ H04W 4/08; H04W 76/10
See application file for complete search history.

(56) References Cited

U.S. PATENT DOCUMENTS

| 12,127,078 B2 * | 10/2024 | Wang ...................... H04W 4/06 |
| 2019/0158985 A1 | 5/2019 | Dao et al. |

(Continued)

FOREIGN PATENT DOCUMENTS

| CN | 110012437 A | 7/2019 |
| CN | 110098942 A | 8/2019 |

(Continued)

OTHER PUBLICATIONS

First Office Action for Chinese Application No. 202110158954.5, dated Dec. 2, 2022, 7 Pages.

(Continued)

*Primary Examiner* — Michael T Vu
(74) *Attorney, Agent, or Firm* — Foley & Lardner LLP

(57) ABSTRACT

A method and apparatus for triggering a non-unicast service operation, and network functions, which belong to the technical field of communications. A specific implementation solution comprises: acquiring non-unicast session information or non-unicast service information; and executing a first operation according to the non-unicast session information or the non-unicast service information, wherein the first operation comprises at least one of the following: sending a first non-unicast session operation instruction to a second network function, and sending a second non-unicast session operation instruction or a non-unicast session context operation instruction to a third network function; and the first non-unicast session operation instruction comprises at least one of the following: a non-unicast session shared resource operation instruction, a non-unicast service operation instruction, the non-unicast session information, information of a first network function, non-unicast quality of (Continued)

service (QoS) stream information, and a non-unicast session operation type.

20 Claims, 12 Drawing Sheets

(51) Int. Cl.
*H04W 28/02* (2009.01)
*H04W 28/16* (2009.01)

(56) References Cited

U.S. PATENT DOCUMENTS

| | | | | |
|---|---|---|---|---|
| 2020/0228936 | A1 | 7/2020 | Talebi Fard | |
| 2021/0037500 | A1* | 2/2021 | Liu | H04L 1/1822 |
| 2022/0225058 | A1 | 7/2022 | Xiong | |
| 2023/0345371 | A1* | 10/2023 | Xin | H04W 4/06 |

FOREIGN PATENT DOCUMENTS

| | | | |
|---|---|---|---|
| CN | 110401922 | A | 11/2019 |
| CN | 111491346 | A | 8/2020 |
| CN | 111526553 | A | 8/2020 |
| CN | 111556539 | A | 8/2020 |

OTHER PUBLICATIONS

ZTE "KI1, new solution Multicast MBS Session establishment linked with unicast PDU session" SA WG2 Meeting #S2-139E, Electronic, Elbonia, Jun. 2020, S2-2004493, 5 Pages.
International Search Report and Written Opinion for Application No. PCT /CN2022/071584, dated Apr. 6, 2022, 8 Pages.
Vivo 'KI #1, Sol #4: Update to solution 4 SA WG2 Meeting #139E e-meeting, Elbonia, Jun. 2020, S2-2004491, 21 Pages.
IN Office Action on IN 202317049216 dtd Feb. 10, 2025.
JP Office Action on IN 202317049216 dtd Feb. 10, 2025.

* cited by examiner

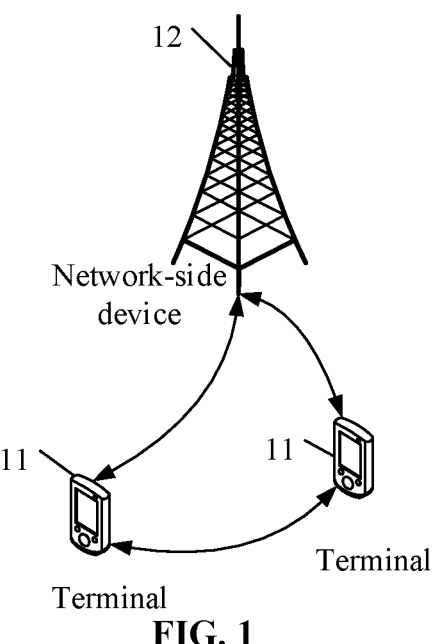

Network-side device

Terminal

Terminal

FIG. 1

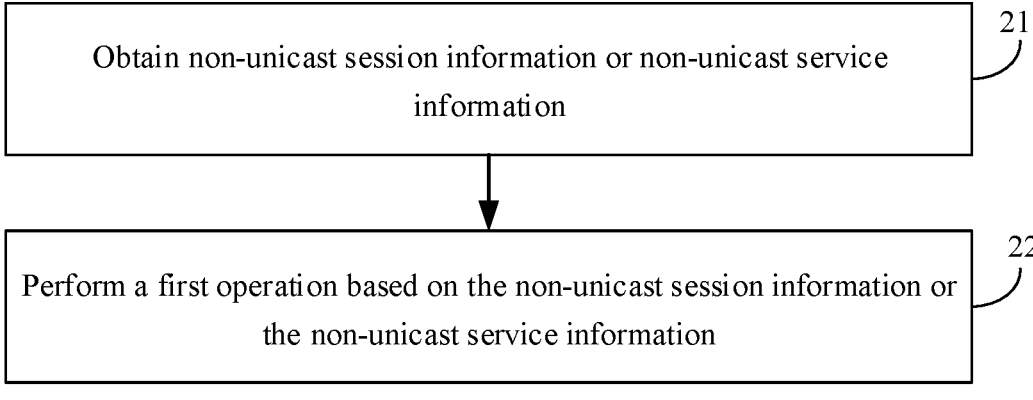

| Obtain non-unicast session information or non-unicast service information | 21 |

| Perform a first operation based on the non-unicast session information or the non-unicast service information | 22 |

FIG. 2

| Perform a second operation based on at least one of the following: a non-unicast capability of a first RAN node and first indication information that is received from a first network function | 31 |

FIG. 3

Figures 4, 5, 6, 7:
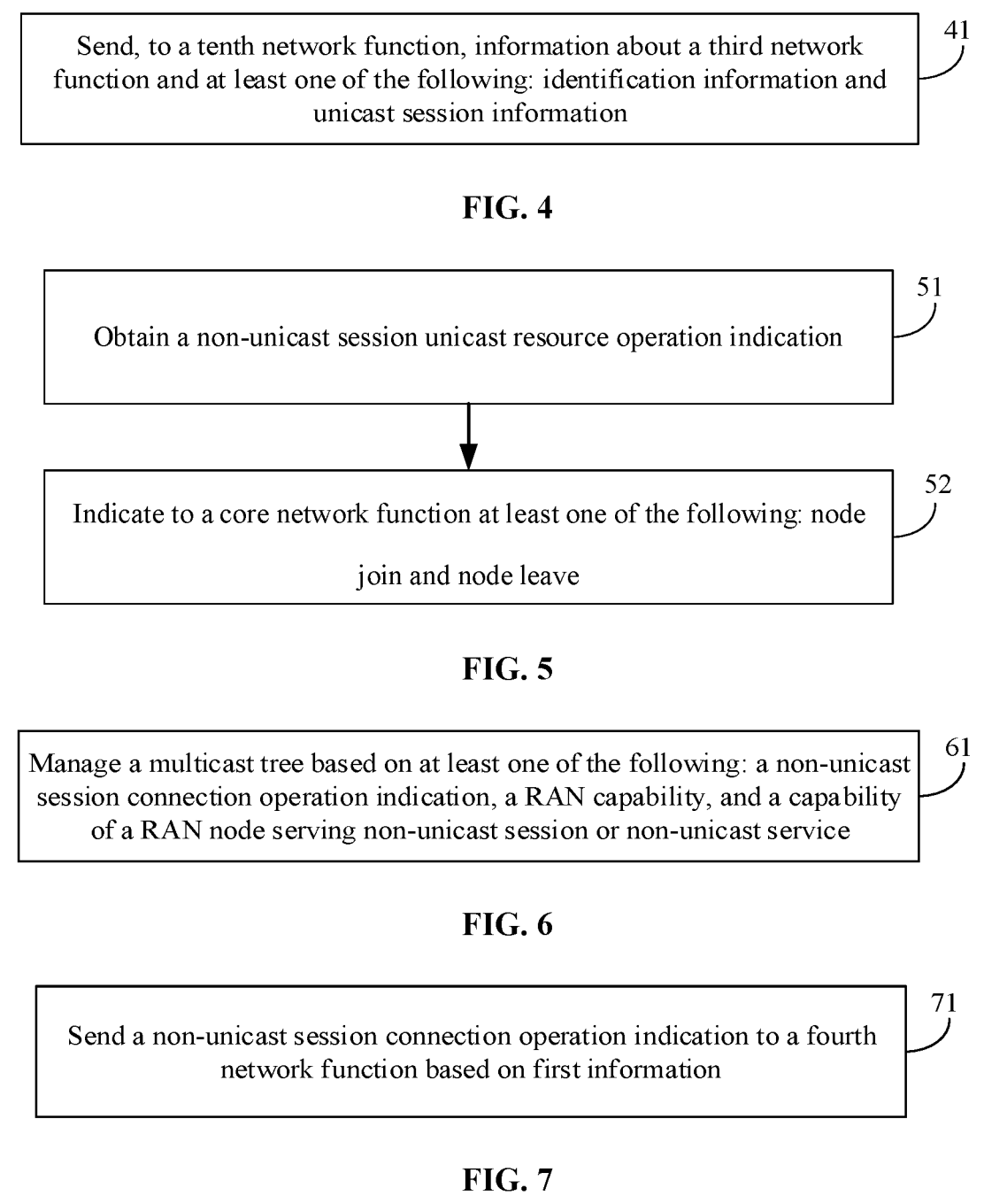

Send, to a tenth network function, information about a third network function and at least one of the following: identification information and unicast session information

Obtain a non-unicast session unicast resource operation indication

51

Indicate to a core network function at least one of the following: node join and node leave

Manage a multicast tree based on at least one of the following: a non-unicast session connection operation indication, a RAN capability, and a capability of a RAN node serving non-unicast session or non-unicast service

Send a non-unicast session connection operation indication to a fourth network function based on first information

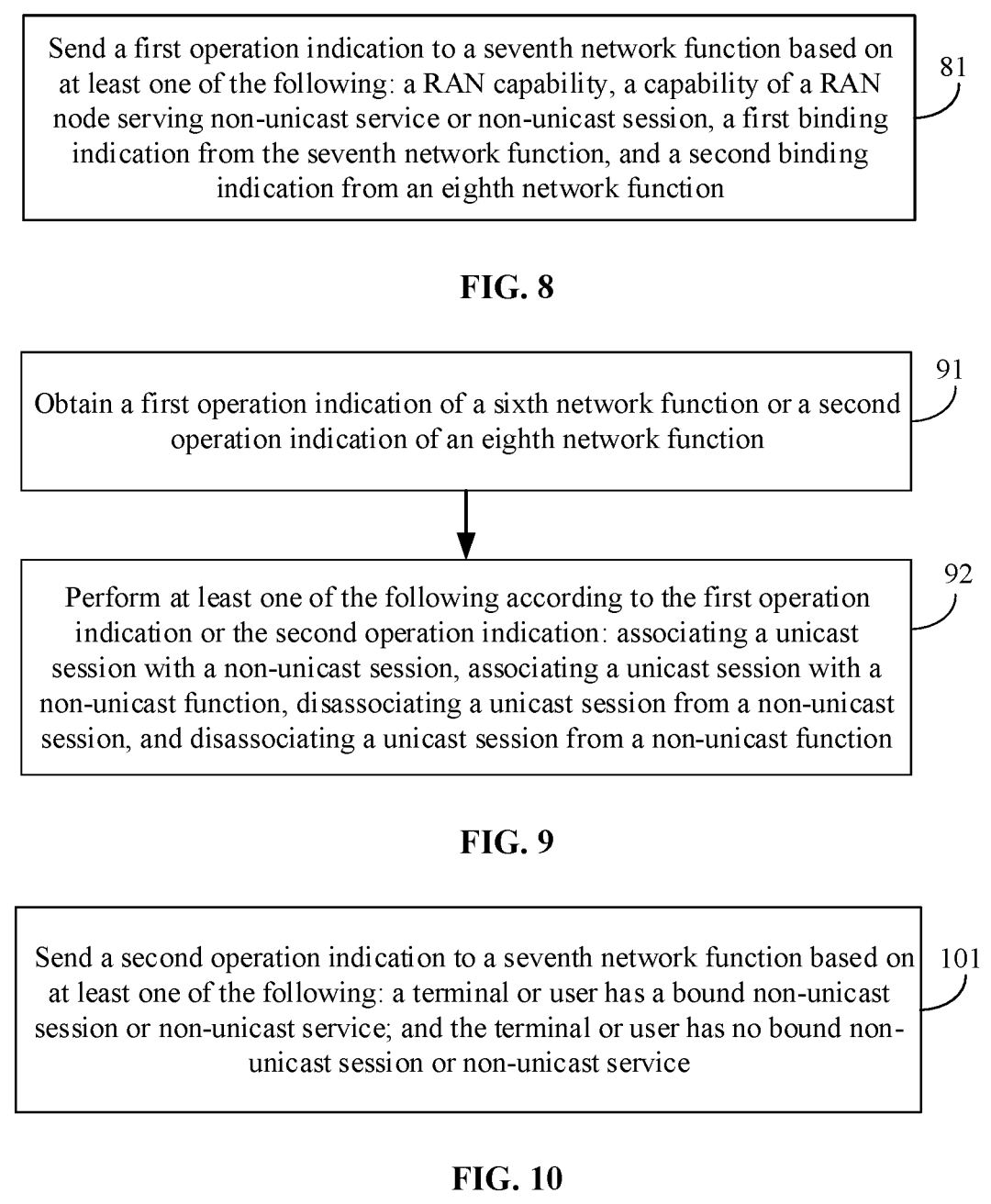

Send a first operation indication to a seventh network function based on at least one of the following: a RAN capability, a capability of a RAN node serving non-unicast service or non-unicast session, a first binding indication from the seventh network function, and a second binding indication from an eighth network function    81

FIG. 8

Obtain a first operation indication of a sixth network function or a second operation indication of an eighth network function    91

Perform at least one of the following according to the first operation indication or the second operation indication: associating a unicast session with a non-unicast session, associating a unicast session with a non-unicast function, disassociating a unicast session from a non-unicast session, and disassociating a unicast session from a non-unicast function    92

FIG. 9

Send a second operation indication to a seventh network function based on at least one of the following: a terminal or user has a bound non-unicast session or non-unicast service; and the terminal or user has no bound non-unicast session or non-unicast service    101

FIG. 10

METHOD AND APPARATUS FOR TRIGGERING NON-UNICAST SERVICE OPERATION, AND NETWORK FUNCTIONS

CROSS-REFERENCE TO RELATED APPLICATIONS

This application is a continuation application of PCT International Application No. PCT/CN2022/071584 filed on Jan. 12, 2022, which claims priority to Chinese Patent Application No. 202110070319.1 filed Jan. 19, 2021, Chinese Patent Application No. 202110129381.3 filed on Jan. 29, 2021, and Chinese Patent Application No. 202110158954.5 filed on Feb. 4, 2021, which are incorporated herein by reference in their entireties.

TECHNICAL FIELD

This application pertains to the field of communications technologies, and specifically relates to a method and an apparatus for triggering a non-unicast service operation, and a network function.

BACKGROUND

In a communications systems such as the fifth-generation mobile communications technology (5th-Generation, 5G) system, multicast services may have two transmission modes: (1) shared mode, where a transport channel shared by multiple terminals is used between a core network and a radio access network (RAN), and one piece of data transmitted can be received by multiple terminals; (2) unicast mode, where a terminal-related transport channel is used between the core network and the RAN, and the channel may include a shared channel between user plane functions of the core network. Two transmission modes may coexist for one multicast service. However, currently only the shared transmission mode is considered for triggering a multicast service operation, thereby affecting multicast services. Therefore, how to trigger a non-unicast service operation in consideration of both the shared transmission mode and the unicast transmission mode is an urgent problem to be solved currently.

SUMMARY

According a first aspect, a method for triggering a non-unicast service operation is provided, which is executed by a first network function, and the method includes:

obtaining non-unicast session information or non-unicast service information; and performing a first operation based on the non-unicast session information or the non-unicast service information.

The first operation includes at least one of the following: sending a first non-unicast session operation indication to a second network function; and sending a second non-unicast session operation indication or a non-unicast session context operation indication to a third network function.

The first non-unicast session operation indication includes at least one of the following:

a non-unicast session shared resource operation indication, a non-unicast service operation indication, non-unicast session information, information about the first network function, non-unicast quality of service QoS flow information, and a non-unicast session operation type.

The second non-unicast session operation indication includes at least one of the following:

a non-unicast session shared resource operation indication, a non-unicast service operation indication, a non-unicast session unicast resource operation indication, non-unicast session information, information about the first network function, non-unicast QoS flow information, and a non-unicast session operation type.

The non-unicast session context operation indication includes at least one of the following:

a non-unicast session shared resource operation indication, a non-unicast service operation indication, a non-unicast session unicast resource operation indication, and a non-unicast session connection operation indication.

The non-unicast session shared resource operation indication includes at least one of the following:

a non-unicast session shared resource operation type, a non-unicast service operation indication, non-unicast session information, information about the first network function, non-unicast QoS flow information, and a non-unicast session operation type.

The non-unicast session unicast resource operation indication includes at least one of the following:

a non-unicast session unicast resource operation type, a non-unicast service operation indication, non-unicast session information, information about the first network function, unicast QoS flow information, a non-unicast session operation type, and unicast session information.

The non-unicast includes at least one of the following: multicast and broadcast.

According to a second aspect, a network function is provided, where the network function includes a processor, a memory, and a program or instructions stored in the memory and capable of running on the processor, and when the program or the instructions are executed by the processor, the steps of the method described above are implemented.

BRIEF DESCRIPTION OF DRAWINGS

FIG. 1 is a block diagram of a wireless communications system to which the embodiments of this application are applicable;

FIG. 2 is a flowchart of a method for triggering a non-unicast service operation according to an embodiment of this application;

FIG. 3 is a flowchart of another method for triggering a non-unicast service operation according to an embodiment of this application;

FIG. 4 is a flowchart of another method for triggering a non-unicast service operation according to an embodiment of this application;

FIG. 5 is a flowchart of another method for triggering a non-unicast service operation according to an embodiment of this application;

FIG. 6 is a flowchart of a method for managing a non-unicast service multicast tree according to an embodiment of this application;

FIG. 7 is a flowchart of another method for managing a non-unicast service multicast tree according to an embodiment of this application;

FIG. 8 is a flowchart of a method for associating a non-unicast service with a unicast session according to an embodiment of this application;

FIG. 9 is a flowchart of another method for associating a non-unicast service with a unicast session according to an embodiment of this application;

FIG. 10 is a flowchart of another method for associating a non-unicast service with a unicast session according to an embodiment of this application;

DETAILED DESCRIPTION

Figure 11:
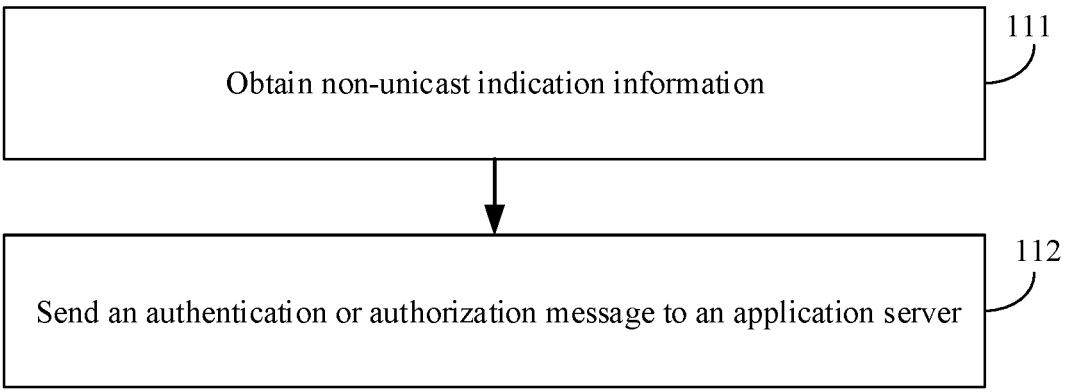
FIG. 11 is a flowchart of a method for non-unicast service authentication or authorization according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, in the specification and claims, "and/or" represents presence of at least one of connected objects, and the symbol "/" in this specification usually indicates an "or" relationship between associated objects.

It should be noted that techniques described in the embodiments of this application are not limited to a long term evolution (LTE) or LTE-Advanced (LTE-Advanced, LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communications system.

FIG. 1 is a block diagram of a wireless communications system to which the embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (Basic Service Set, BSS), an extended service set (ESS), a NodeB, an evolved NodeB (eNB), a home NodeB, a home evolved NodeB, a wireless local area network (WLAN) access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

In the embodiments of this application, network functions, such as a first network function, a second network function, a third network function, a fourth network function, and the like, may also be referred to as network function entities.

In the embodiments of the application, optionally, the network function may include but is not limited to at least one of the following: access mobility management function (AMF), session management function (SMF), intermediate SMF (I-SMF), user plane function (UPF), intermediate UPF (I-UPF), multicast and broadcast session management function (MB-SMF), multicast and broadcast user plane function (MB-UPF), unified data management (UDM), unified data storage (UDR), home subscriber server (HSS), application function (AF), network exposure function (NEF), unstructured data storage function (UDSF), and the like.

Optionally, information about the network function may be referred to as network function information. For example, information about the first network function may be referred to as first-network-function information, information about the second network function may be referred to as second-network-function information, information about the third network function may be referred to as third-network-function information, and so on.

In the embodiments of this application, decouple shared channel operation and individual channel operation are two types of operations.

Optionally, in the following embodiments, any combination of MB-SMF, SMF, MB-UPF, UPF, I-SMF, and I-UPF may be colocated.

Optionally, in the following embodiments, the MB-SMF and the AMF exchanges a non-unicast session operation indication, which may include a non-unicast session shared resource operation indication, a non-unicast service operation indication, and the like.

Optionally, in the following embodiments, the MB-SMF and the SMF/I-SMF exchange a non-unicast session context operation indication, which may include a non-unicast session unicast resource operation indication, a non-unicast session connection operation indication, a non-unicast service operation indication, a non-unicast session shared resource operation indication, and the like.

Optionally, in the following embodiments, the SMF/I-SMF and the AMF exchanges a non-unicast session operation indication, which may include a non-unicast session unicast resource operation indication, a non-unicast session shared resource operation indication, a non-unicast service operation indication, and the like.

Optionally, in the following embodiments, the AMF and the RAN node exchange a non-unicast session shared resource operation indication and/or a non-unicast session unicast resource operation indication.

Optionally, in the following embodiments, a non-unicast service operation indication is exchanged between the AF and the MB-SMF, or between the UE and the AMF.

Optionally, non-unicast includes at least one of the following: multicast and broadcast.

In the embodiments of this application, the shared resource is used for transmitting one piece of data to a base station by a core-network network element, and the base station transmits the piece of data to an unspecified number of terminals.

In the embodiments of this application, the unicast resource is used for transmitting one piece of data to one terminal by a core-network network element, and the unicast resource may include any one of the following: a resource being used for transmitting non-unicast data and a resource prepared for transmitting non-unicast data.

In the embodiments of this application, the MB-SMF may request authorization information of a terminal/user from the UDM. The authorization information is related to operator information and non-unicast function, or related to operator information and non-unicast service, or related to operator information and non-unicast session. After that, the MB-SMF may determine whether the user/terminal is allowed to perform non-unicast function/non-unicast service/non-unicast session on a corresponding operator based on the authorization information; if allowed, subsequent operations are performed; otherwise, subsequent operations are not performed.

The following describes in detail a non-unicast service related method provided in the embodiments of this application by using specific embodiments and application scenarios thereof with reference to the accompanying drawings.

Refer to FIG. 2. FIG. 2 is a flowchart of a method for triggering a non-unicast service operation according to an embodiment of this application. The method is performed by a first network function, and the first network function may include but is not limited to any one of the MB-SMF (in the example shown in FIG. 12), the SMF/I-SMF (in the example shown in FIG. 13), the AMF (in the example shown in FIG. 14 and FIG. 15), and the like. As shown in FIG. 2, the method includes the following steps.

Step 21: Obtain non-unicast session information or non-unicast service information.

In this embodiment, non-unicast includes at least one of the following: multicast and broadcast.

Step 22: Perform a first operation based on the non-unicast session information or the non-unicast service information.

Optionally, the first operation may include at least one of the following: sending a first non-unicast session operation indication to a second network function; and sending a second non-unicast session operation indication or a non-unicast session context operation indication to a third network function.

Figure 12:
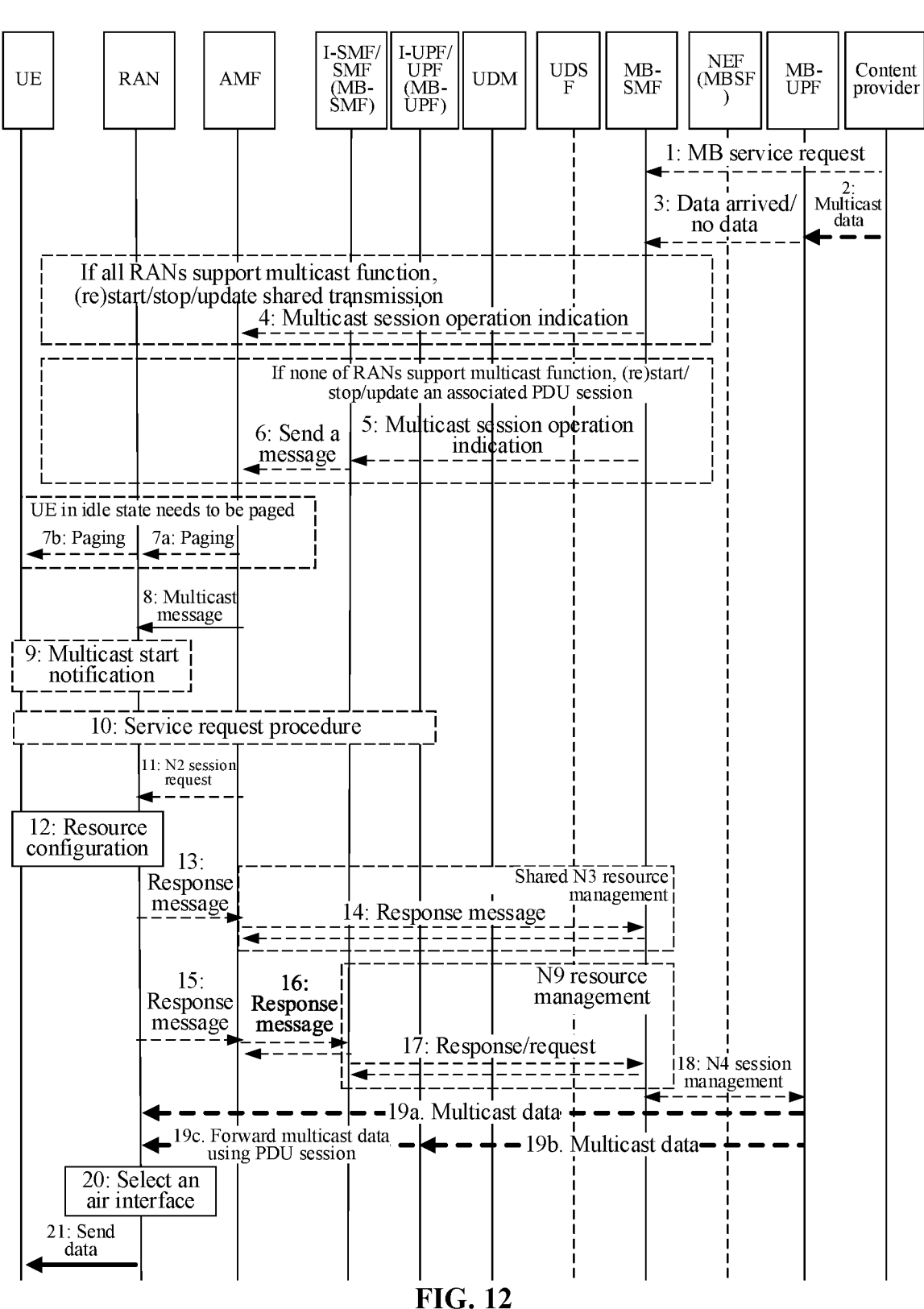
FIG. 12 is a flowchart of a related service operation procedure in example 1 of this application.
Figure 13:
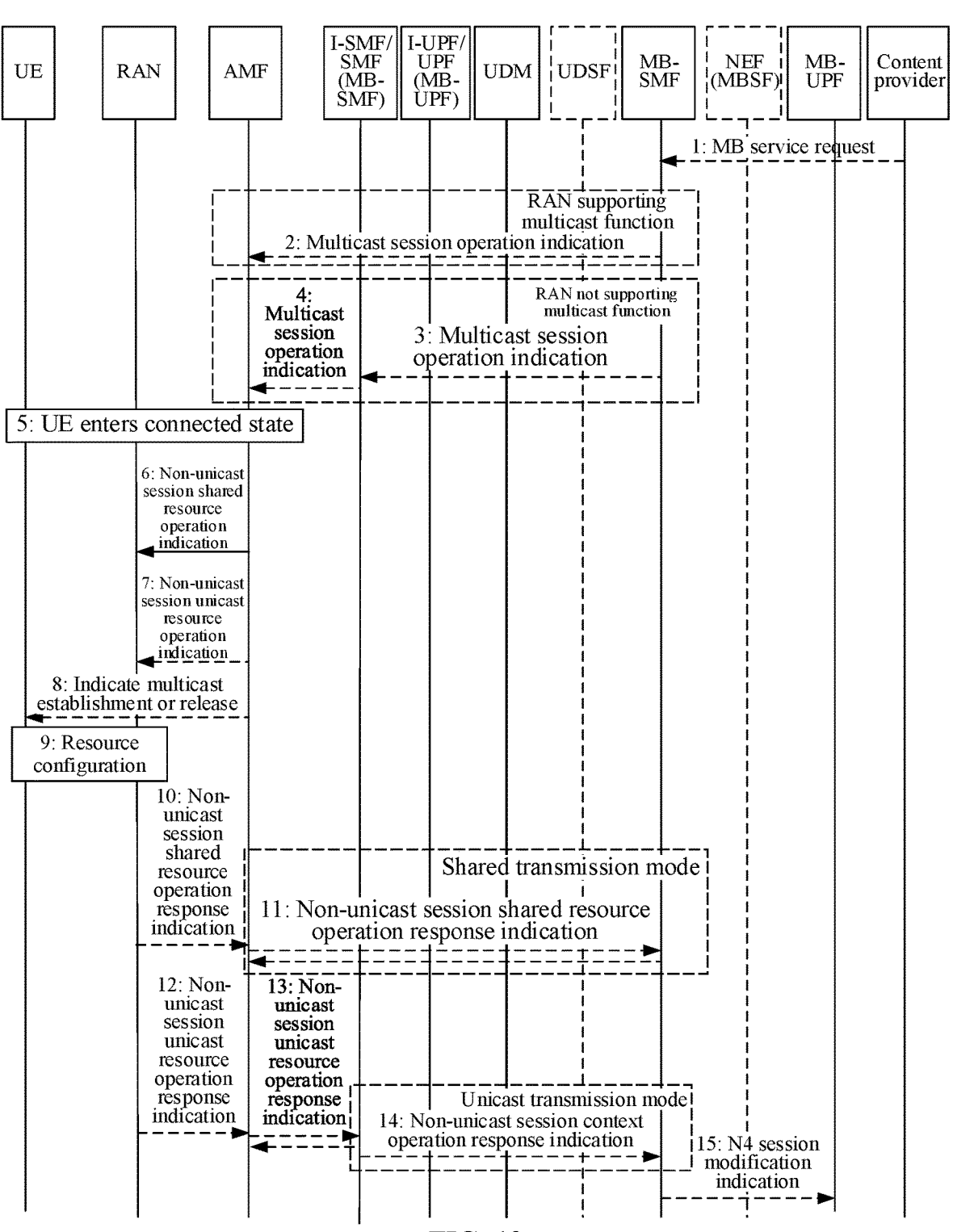
FIG. 13 is a flowchart of a related service operation procedure in example 2 of this application.

In an implementation, when the first network function is an MB-SMF or SMF/I-SMF, the second network function may optionally be an AMF, as shown in the examples in FIG. 12 and FIG. 13. Alternatively, when the first network function is an AMF, the second network function may optionally be an MB-SMF, as shown in the examples in FIG. 14 and FIG. 15.

In another implementation, when the first network function is an MB-SMF, the third network function may optionally be an SMF or I-SMF, as shown in the example in FIG. 12. Alternatively, when the first network function is an SMF/I-SMF, the third network function may optionally be an AMF, as shown in the example in FIG. 13. Alternatively, when the first network function is an AMF, the third network function may optionally be an SMF or I-SMF, as shown in the examples in FIG. 14 and FIG. 15. Alternatively, when the first network function is an NEF or MBSF, the third network function may optionally be an MB-SMF, as shown in the examples in FIG. 12 and FIG. 13.

Optionally, the first non-unicast session operation indication may include at least one of the following:

a non-unicast session shared resource operation indication, a non-unicast service operation indication, non-unicast session information, information about the first network function, non-unicast quality of service (QoS) flow information, and a non-unicast session operation type.

Optionally, the second non-unicast session operation indication may include at least one of the following:

a non-unicast session shared resource operation indication, a non-unicast service operation indication, a non-unicast session unicast resource operation indication, non-unicast session information, information about the first network function, non-unicast QoS flow information, and a non-unicast session operation type.

In an optional embodiment, the unicast resource may include but is not limited to: a protocol data unit (PDU) session resource and a connection resource. The connection resource may include a transmission resource between the MB-UPF and the UPF/I-UPF.

Optionally, the non-unicast session context operation indication may include at least one of the following:

a non-unicast session shared resource operation indication, a non-unicast service operation indication, a non-unicast session unicast resource operation indication, and a non-unicast session connection operation indication.

Optionally, the non-unicast session shared resource operation indication may include at least one of the following:

a non-unicast session shared resource operation type, a non-unicast service operation indication, non-unicast session information, information about the first network function, non-unicast QoS flow information, and a non-unicast session operation type.

Optionally, the non-unicast session unicast resource operation indication may include at least one of the following:

a non-unicast session unicast resource operation type, a non-unicast service operation indication, non-unicast session information, information about the first network function, unicast QoS flow information, a non-unicast session operation type, and unicast session information.

In an implementation, the first network function may perform the first operation after receiving a data arrival report.

It is not difficult to understand that in the method for triggering a non-unicast service operation in the embodiments of this application, the first operation is performed based on the obtained non-unicast session information or non-unicast service information, so as to trigger a non-unicast service operation in consideration of both shared transmission mode and unicast transmission mode.

In this embodiment of the application, optionally, the non-unicast session connection operation indication may satisfy at least one of the following:

indicating a user plane node to join;
indicating the user plane node to leave;
indicating the user plane node to stay;
indicating the user plane node not to join;
indicating the user plane node not to leave;
without indicating the user plane node to join;
without indicating the user plane node to leave;
without indicating the user plane node to stay;
without indicating the user plane node not to join;
without indicating the user plane node not to leave;
indicating a control plane node to join;
indicating the control plane node to leave;
indicating the control plane node to stay;
indicating the control plane node not to join;
indicating the control plane node not to leave;
without indicating the control plane node to join;
without indicating the control plane node to leave;
without indicating the control plane node to stay;
without indicating the control plane node not to join; and
without indicating the control plane node not to leave.

Optionally, the performing a first operation may include: performing the first operation based on a RAN capability.

Optionally, the step 22 may include any one of the following:

performing the first operation based on context information of a non-unicast session corresponding to the non-unicast session information; and performing the first operation based on context information of a non-unicast service corresponding to the non-unicast service information.

Optionally, the performing a first operation may include at least one of the following:

in a case that all RAN nodes support a non-unicast function, performing the sending the first non-unicast session operation indication to the second network function;

in a case that all RAN nodes serving non-unicast service or non-unicast session support a non-unicast function, performing the sending the first non-unicast session operation indication to the second network function;

in a case that context information of a non-unicast service or non-unicast session includes no information about a third network function, performing the sending the first non-unicast session operation indication to the second network function;

in a case that the context information of the non-unicast service or non-unicast session includes information about the second network function, sending the first non-unicast session operation indication to the second network function; and in a case that the context information of the non-unicast service or non-unicast session includes the information about the second network function, sending the first non-unicast session operation indication to the third network function.

It should be noted that in this embodiment, the non-unicast service corresponds to the obtained non-unicast service information, and the non-unicast session corresponds to the obtained non-unicast session information.

Optionally, the performing a first operation may include at least one of the following:

in a case that not all RAN nodes support a non-unicast function, performing the sending a second non-unicast session operation indication or a non-unicast session context operation indication to the third network function;

in a case that not all RAN nodes serving non-unicast service or non-unicast session support a non-unicast function, performing the sending a second non-unicast session operation indication or a non-unicast session context operation indication to the third network function;

in a case that none of RAN nodes support a non-unicast function, performing the sending a second non-unicast session operation indication or a non-unicast session context operation indication to the third network function;

in a case that none of RAN nodes serving non-unicast service or non-unicast session support a non-unicast function, performing the sending a second non-unicast session operation indication or a non-unicast session context operation indication to the third network function;

in a case that context information of a non-unicast service or non-unicast session includes information about the third network function, sending the second non-unicast session operation indication or the non-unicast session context operation indication to the third network function;

in a case that the context information of the non-unicast service or non-unicast session includes no information about the second network function, sending the second non-unicast session operation indication or the non-unicast session context operation indication to the third network function;

in a case that context information of a non-unicast service or non-unicast session includes no information about the third network function, sending the second non-unicast session operation indication or the non-unicast session context operation indication to the third network function; and in a case that the context information of the non-unicast service or non-unicast session includes information about the second network function, sending the second non-unicast session operation indication or the non-unicast session context operation indication to the third network function.

Further, the method in this embodiment may further include:

performing the sending the first non-unicast session operation indication to the second network function, or sending the first non-unicast session operation indication to the second network function.

Optionally, before the performing a first operation, the method in this embodiment may further include:

obtaining user information or terminal information.

Further, the performing a first operation described above may include: performing the first operation based on context information of a user corresponding to the user information; or performing the first operation based on context information of a terminal corresponding to the terminal information.

Optionally, before the performing a first operation, the method in this embodiment may further include:

obtaining user information or terminal information.

Further, the performing a first operation may include at least one of the following:

in a case that a user or terminal has no unicast session associated with a non-unicast function (such as a PDU Session), performing the sending the first non-unicast session operation indication to the second network function;

in a case that a user or terminal has no unicast session associated with a non-unicast service (such as a PDU Session), performing the sending the first non-unicast session operation indication to the second network function; and in a case that a user or terminal has no unicast session associated with a non-unicast session (such as a PDU Session), performing the sending the first non-unicast session operation indication to the second network function.

It should be noted that the user corresponds to the obtained user information. The terminal corresponds to the obtained terminal information.

Optionally, before the performing a first operation, the method in this embodiment may further include:

obtaining user information or terminal information.

Further, the performing a first operation may include at least one of the following:

in a case that a user or terminal has a unicast session associated with the non-unicast function, performing the sending a second non-unicast session operation indication or a non-unicast session context operation indication to a third network function;

in a case that a user or terminal has a unicast session associated with the non-unicast service, performing the sending a second non-unicast session operation indication or a non-unicast session context operation indication to a third network function; and in a case that a user or terminal has a unicast session associated with the non-unicast session, performing the sending a second non-unicast session operation indication or a non-unicast session context operation indication to a third network function.

The user corresponds to the user information, and the terminal corresponds to the terminal information; and the non-unicast service corresponds to the non-unicast service information, and the non-unicast session corresponds to the non-unicast session information.

Further, the method in this embodiment may further include:

performing the sending the first non-unicast session operation indication to the second network function.

Optionally, the first non-unicast session operation indication may further include at least one of the following:

user information, user list information, terminal information, terminal list information, first indication information, RAN node information, RAN node list information, and unicast session information.

The first indication information is used to indicate at least one of the following: non-unicast resource operation type information, paging not required, and paging required.

The non-unicast resource operation type information includes at least one of the following:

shared resource operation and unicast resource operation.

Optionally, the second non-unicast session operation indication may further include at least one of the following:

user information, user list information, terminal information, terminal list information, second indication information, and unicast session information.

The second indication information is used to indicate at least one of the following: non-unicast resource operation type information, paging not required, and paging required.

The non-unicast resource operation type information includes at least one of the following:

shared resource operation and unicast resource operation.

Optionally, the non-unicast service operation indication may include any one of the following: a non-unicast start indication, a non-unicast update indication, a non-unicast stop indication, a non-unicast join indication, and a non-unicast leave indication.

In this embodiment of this application, before the performing a first operation, the method in this embodiment may further include:

obtaining first authorization information, where the first authorization information includes at least one of the following: user non-unicast function authorization information related to operator information, user non-unicast service authorization information related to operator information, and user non-unicast session authorization information related to operator information.

The performing a first operation includes: performing the first operation based on the first authorization information.

Further, the method in this embodiment may further include:

obtaining information about the third network function and unicast session information from a tenth network function based on user information and/or terminal information.

The unicast session information includes at least one of the following:

a session management context identifier and a PDU session identifier.

Further, before the performing a first operation, the method in this embodiment may further include:

obtaining user information and/or terminal information from a tenth network function based on identification information.

The identification information includes at least one of the following:

an IP address, a MAC address, a user identifier, and a terminal identifier.

It should be noted that the MB-SMF in this embodiment may request authorization information of a terminal/user from the UDM. The authorization information is related to operator information and non-unicast function, or related to operator information and non-unicast service, or related to operator information and non-unicast session. After that, the MB-SMF may determine whether the user/terminal is allowed to perform non-unicast function/non-unicast service/non-unicast session on a corresponding operator based on the authorization information; if allowed, subsequent operations are performed; otherwise, subsequent operations are not performed.

Refer to FIG. 3. FIG. 3 is a flowchart of a method for triggering a non-unicast service operation according to an embodiment of this application. The method is performed by a second network function, and the second network function may include but is not limited to any one of the AMF (in the examples shown in FIG. 12 and FIG. 13), the MB-SMF (in the examples shown in FIG. 14 and FIG. 15), and the like. As shown in FIG. 3, the method includes the following steps.

Step 31: Perform a second operation based on at least one of the following: a non-unicast capability of a first RAN node and first indication information that is received from a first network function.

In an implementation, when the first network function is an MB-SMF or SMF/I-SMF, the second network function may optionally be an AMF, as shown in the examples in FIG. 12 and FIG. 13. Alternatively, when the first network function is an AMF, the second network function may optionally be an MB-SMF, as shown in the examples in FIG. 14 and FIG. 15.

In this embodiment, the second operation may include at least one of the following:

sending a single paging message to the first RAN node, sending a non-unicast session shared resource operation indication to the first RAN node, suspending sending of the non-unicast session shared resource operation indication, sending a non-unicast session unicast resource operation indication to the first RAN node, suspending sending of the non-unicast session unicast resource operation indication, and sending a group paging message to the first RAN node.

Optionally, the first indication information is used to indicate at least one of the following: non-unicast resource operation type information, paging not required, and paging required.

Optionally, after a failure indication sent by the first RAN node is received or after a response time of the first RAN node expires, the method in this embodiment may further include:

sending at least one of the following to a second RAN node:

a non-unicast session shared resource operation indication and a non-unicast session unicast resource operation indication.

Optionally, the method in this embodiment may further include:

obtaining non-unicast capability information by receiving non-unicast related information from a RAN node, so as to determine a non-unicast capability of the RAN node.

It is not difficult to understand that the second operation is performed by the second network function in this embodiment, so as to trigger a non-unicast service operation in consideration of both shared transmission mode and unicast transmission mode.

Refer to FIG. 4. FIG. 4 is a flowchart of a method for triggering a non-unicast service operation according to an embodiment of this application. The method is performed by a third network function, and the third network function may include but is not limited to any one of the SMF or I-SMF (in the examples shown in FIG. 12 to FIG. 15), and the like. As shown in FIG. 4, the method includes the following steps.

Step 41: Send, to a tenth network function, information about the third network function and at least one of the following:

user information, terminal information, and unicast session information.

The unicast session information includes at least one of the following:

a session management context identifier and a PDU session identifier.

Refer to FIG. 5. FIG. 5 is a flowchart of a method for triggering a non-unicast service operation according to an embodiment of this application. The method is executed by an access-side network device, and the access-side network device includes but is not limited to any one of a RAN node, an NR node (gNB, namely 5G base station), and so on. As shown in FIG. 5, the method includes the following steps.

Step 51: Obtain a non-unicast session unicast resource operation indication.

Step 52: Indicate to a core network function at least one of the following: node join and node leave.

In the prior art, for non-unicast service, a shared transmission mode and a unicast transmission mode may coexist. In this case, how to manage a multicast tree is an urgent problem to be resolved at present.

Refer to FIG. 6. FIG. 6 is a flowchart of a method for managing a non-unicast service multicast tree according to an embodiment of this application. The method is performed by a fourth network function, and the fourth network function may include but is not limited to any one of the MB-SMF (in the example shown in FIG. 12), the SMF/I-SMF (in the example shown in FIG. 13), the AMF (in the example shown in FIG. 14 and FIG. 15), and the like. As shown in FIG. 6, the method includes the following steps.

Step 61: Manage a multicast tree based on at least one of the following: a non-unicast session connection operation indication, a RAN capability, and a capability of a RAN node serving non-unicast session or non-unicast service.

Optionally, the non-unicast session connection operation indication is received from a fifth network function.

In an implementation, when the fourth network function is an MB-SMF, the fifth network function may optionally be an SMF or I-SMF, as shown in the example in FIG. 12. Alternatively, when the fourth network function is an SMF/I-SMF, the fifth network function may optionally be an AMF, as shown in the example in FIG. 13. Alternatively, when the fourth network function is an AMF, the fifth network function may be an SMF or I-SMF, as shown in the examples in FIG. 14 and FIG. 15.

Optionally, the multicast tree includes at least one of the following: a control plane multicast tree and a user plane multicast tree.

It should be noted that the multicast tree uses a tree structure, and nodes in the multicast tree are used for managing multicast traffic/multicast service.

It can be understood that, in this embodiment, according to the non-unicast session connection operation indication, RAN capability, and/or capability of the RAN node serving non-unicast session or non-unicast service, it is possible to manage the multicast tree in consideration of both shared transmission mode and unicast transmission mode.

In this embodiment of the application, the non-unicast session connection operation indication may include at least one of the following:

a user plane node management indication and a control plane node management indication.

Optionally, the user plane node management indication may satisfy at least one of the following:

indicating a user plane node to join;
indicating the user plane node to leave;
indicating the user plane node to stay;
indicating the user plane node not to join;
indicating the user plane node not to leave;
without indicating the user plane node to join;
without indicating the user plane node to leave;
without indicating the user plane node to stay;
without indicating the user plane node not to join;
without indicating the user plane node not to leave;
a non-unicast session shared resource operation indication; and
a non-unicast session unicast resource operation indication.

Optionally, the control plane node management indication satisfies at least one of the following:

indicating a control plane node to join;
indicating the control plane node to leave;
indicating the control plane node to stay;
indicating the control plane node not to join;
indicating the control plane node not to leave;
without indicating the control plane node to join;
without indicating the control plane node to leave;
without indicating the control plane node to stay;
without indicating the control plane node not to join;
without indicating the control plane node not to leave;
a non-unicast session shared resource operation indication; and
a non-unicast session unicast resource operation indication.

Optionally, the method in this embodiment may further include: obtaining information about the RAN node. The managing a multicast tree includes: managing a control plane multicast tree. The managing a control plane multicast tree includes at least one of the following:

adding the information about the RAN node to the control plane multicast tree; and
removing the information about the RAN node from the control plane multicast tree.

Optionally, the method in this embodiment may further include: obtaining information about a transmission endpoint. The managing a multicast tree includes: managing a user plane multicast tree. The managing a user plane multicast tree may include at least one of the following:

adding the information about the transmission endpoint to the user plane multicast tree; and
removing the information about the transmission endpoint from the user plane multicast tree.

The information about the transmission endpoint includes at least one of the following: an IP address, a port, tunnel information, node information, and the like.

In this embodiment of this application, optionally, the managing a multicast tree includes: managing a user plane multicast tree. The managing a user plane multicast tree includes at least one of the following:

increasing a user plane node count; and
decreasing the user plane node count.

Optionally, the managing a multicast tree may include: managing a control plane multicast tree. The managing a control plane multicast tree includes at least one of the following:

increasing a control plane node count; and
decreasing the control plane node count.

Optionally, the method in this embodiment may further include:

managing the user plane multicast tree according to the user plane node management indication;
managing the control plane multicast tree according to the user plane node management indication;
managing the control plane multicast tree according to the control plane node management indication; and
managing the user plane multicast tree according to the control plane node management indication.

Optionally, the managing a multicast tree may include: managing a control plane multicast tree. The managing a control plane multicast tree may include at least one of the following:

adding information about the fifth network function to the control plane multicast tree; and
removing information about the fifth network function from the control plane multicast tree.

Optionally, the method in this embodiment may further include at least one of the following:

managing the control plane multicast tree according to the control plane node management indication and information about the fifth network function; and
managing the control plane multicast tree according to the user plane node management indication and information about the fifth network function.

Optionally, the method in this embodiment may further include at least one of the following:

controlling a user plane function to start data transmission; and
controlling a user plane function to stop data transmission.

Optionally, the method in this embodiment may further include at least one of the following:

in a case that the first node joins the user plane multicast tree, controlling a user plane function to start data transmission; and
in a case that the last node leaves the user plane multicast tree, controlling a control plane function to stop data transmission.

Refer to FIG. 7. FIG. 7 is a flowchart of a method for managing a non-unicast service multicast tree according to an embodiment of this application. The method is performed by a fifth network function, and the fifth network function may include but is not limited to any one of the SMF/I-SMF (in the examples shown in FIG. 12, FIG. 13, and FIG. 14), the AMF (in the example shown in FIG. 13), and the like. As shown in FIG. 7, the method includes the following steps.

Step 71: Send a non-unicast session connection operation indication to a fourth network function based on first information.

The first information includes at least one of the following:

a user plane function controlled by the fifth network function uses a non-unicast session unicast resource to transmit data to the first terminal;

a user plane function controlled by the fifth network function stops using a non-unicast session unicast resource to transmit data to the last terminal;

the fifth network function provides a service to the first terminal or user; and the fifth network function stops providing a service to the last terminal or user.

Optionally, the non-unicast session connection operation indication further includes at least one of the following:

a user plane node management indication and a control plane node management indication.

For specific descriptions of the user plane node management indication and the control plane node management indication, reference may be made to the embodiment in FIG. 6, and details are not repeated herein.

In this way, the non-unicast session connection operation indication is sent to the fourth network function, so that the fourth network function can manage the multicast tree.

Refer to FIG. 8. FIG. 8 is a flowchart of a method for associating a non-unicast service with a unicast session according to an embodiment of this application. The method is performed by a sixth network function, and the sixth network function may include but is not limited to any one of the MB-SMF (in the example shown in FIG. 12), the SMF/I-SMF (in the example shown in FIG. 13), the AMF (in the example shown in FIG. 14 and FIG. 15), and the like. As shown in FIG. 8, the method includes the following steps.

Step 81: Send a first operation indication to a seventh network function based on at least one of the following: a RAN capability, a capability of a RAN node serving non-unicast service or non-unicast session, a first binding indication from the seventh network function, and a second binding indication from an eighth network function.

In an implementation, when the sixth network function is an MB-SMF or SMF/I-SMF, the seventh network function may optionally be an AMF, as shown in the examples in FIG. 12 and FIG. 13. Alternatively, when the sixth network function is an AMF, the seventh network function may optionally be an MB-SMF, as shown in the examples in FIG. 14 and FIG. 15.

In another implementation, when the sixth network function is an MB-SMF, the eighth network function may optionally be an SMF or I-SMF, as shown in the example in FIG. 12. Alternatively, when the sixth network function is an SMF/I-SMF, the eighth network function may optionally be an AMF, as shown in the example in FIG. 13. Alternatively, when the sixth network function is an AMF, the eighth network function may optionally be an SMF or I-SMF, as shown in the examples in FIG. 14 and FIG. 15.

Optionally, the first binding indication includes unicast session information and at least one of the following:

a non-unicast service operation indication, non-unicast session information, a non-unicast service operation type, a non-unicast session operation type, and a non-unicast indication.

Further, the first binding indication may further include at least one of the following:

user information and terminal information.

Optionally, the second binding indication includes at least one of the following:

a user has joined, the user has not left, the user has left, the user has not joined, a service has started, the service has not started, the service has stopped, the service has not stopped, the user is not allowed to join, the user is allowed to join, not binding, binding, unbinding, and not unbinding.

Optionally, the first operation indication includes at least one of the following:

an association indication, a disassociation indication, an unassociation indication, and an association retaining indication.

Optionally, the method in this embodiment may further include:

sending at least one of the following to the eighth network function:

non-unicast session unicast resource operation indication, non-unicast session information, non-unicast service information, non-unicast session shared resource operation indication, non-unicast session operation type, unicast session information, user information, and terminal information.

Optionally, the sending a first operation indication to a seventh network function may include:

sending an unbinding indication to the seventh network function based on at least one of the following:

all RAN nodes support non-unicast, or all RAN nodes serving a non-unicast service or non-unicast session support non-unicast;

a second binding indication of the eighth network function, where the binding indication is at least one of the following: a user has joined, the user has not left, a service has not started, the service has stopped, the user is not allowed to join, not binding, and unbinding.

Optionally, the sending a first operation indication to a seventh network function may include:

sending a binding indication to the seventh network function based on at least one of the following:

not all RAN nodes support non-unicast, not all RAN nodes serving a non-unicast service or non-unicast session support non-unicast, none of RAN nodes support non-unicast, and none of RAN nodes serving a non-unicast service or non-unicast session support non-unicast; and a second binding indication of the eighth network function, where the binding indication is at least one of the following: a user has not joined, the user has left, a service has started, the service has not stopped, the user is allowed to join, binding, and unbinding.

It is not difficult to understand that through this embodiment, the association between non-unicast service and unicast session can be implemented.

Refer to FIG. 9. FIG. 9 is a flowchart of a method for triggering a non-unicast service operation according to an embodiment of this application. The method is performed by a seventh network function, and the seventh network function may include but is not limited to any one of the AMF (in the examples shown in FIG. 12 and FIG. 13), the MB-SMF (in the examples shown in FIG. 14 and FIG. 15), and the like. As shown in FIG. 9, the method includes the following steps.

Step 91: Obtain a first operation indication of a sixth network function or a second operation indication of an eighth network function.

Optionally, the first operation indication includes at least one of the following:

an association indication, a disassociation indication, an unassociation indication, and an association retaining indication.

Optionally, the second operation indication includes at least one of the following:

an association indication, a disassociation indication, an unassociation indication, and an association retaining indication.

Step 92: Perform at least one of the following according to the first operation indication or the second operation indication: associating a unicast session with a non-unicast session, associating a unicast session with a non-unicast function, disassociating a unicast session from a non-unicast session, and disassociating a unicast session from a non-unicast function.

Optionally, the method in this embodiment may further include:

sending a first binding indication to the sixth network function based on at least one of the following:

terminal capability, RAN capability, and RAN capability for serving a non-unicast service or non-unicast session.

The first binding indication includes unicast session information and at least one of the following:

a non-unicast service operation indication, non-unicast session information, a non-unicast service operation type, a non-unicast session operation type, and a non-unicast indication.

Optionally, the method in this embodiment may further include at least one of the following:

obtaining capability information of a terminal; and obtaining capability information of a RAN node.

In this way, with the capability information of the terminal and/or the capability information of the RAN node, the association operation between the non-unicast service and the unicast session can be properly implemented.

Optionally, the method in this embodiment may further include at least one of the following:

in a case that a terminal does not support non-unicast, sending a first binding indication to the sixth network function; and in a case that not all RAN nodes support non-unicast, not all RAN nodes serving a non-unicast service or non-unicast session support non-unicast, none of RAN nodes support non-unicast, or none of RAN nodes serving a non-unicast service or non-unicast session support non-unicast, sending the first binding indication to the sixth network function.

The first binding indication includes unicast session information and at least one of the following:

a non-unicast service operation indication, non-unicast session information, a non-unicast service operation type, a non-unicast session operation type, and a non-unicast indication.

It is not difficult to understand that through this embodiment, the association between non-unicast service and unicast session can be implemented.

Refer to FIG. 10. FIG. 10 is a flowchart of a method for managing a non-unicast service multicast tree according to an embodiment of this application. The method is performed by an eighth network function, and the eighth network function may include but is not limited to any one of the SMF/I-SMF (in the examples shown in FIG. 12, FIG. 13, and FIG. 14), the AMF (in the example shown in FIG. 15), and the like. As shown in FIG. 10, the method includes the following steps.

Step 101: Send a second operation indication to a seventh network function based on at least one of the following: the terminal or user has a bound non-unicast session or non-unicast service; and the terminal or user has no bound non-unicast session or non-unicast service.

Optionally, the second operation indication includes at least one of the following: an association indication, a disassociation indication, an unassociation indication, and an association retaining indication.

Optionally, the method in this embodiment may further include:

obtaining a third binding indication of a sixth network function; and managing the non-unicast service or non-unicast session of the terminal according to the third binding indication; or manage the non-unicast service or non-unicast session of the user according to the third binding indication.

The third binding indication includes at least one of the following: a user has joined, the user has not left, a service has not started, the service has stopped, the user is not allowed to join, not binding, and unbinding.

It is not difficult to understand that through this embodiment, the association between non-unicast service and unicast session can be implemented.

Refer to FIG. 11. FIG. 11 is a flowchart of a method for non-unicast service authentication or authorization according to an embodiment of this application. The method is performed by a ninth network function, and the ninth network function may include but is not limited to any one of the SMF/I-SMF (in the examples shown in FIG. 14 and FIG. 15), the MB-SMF (in the examples shown in FIG. 14 and FIG. 15), and the like. As shown in FIG. 11, the method includes the following steps.

Step 111: Obtain non-unicast indication information.

In this embodiment, the non-unicast indication information includes at least one of the following: unicast session information and a non-unicast service operation indication, non-unicast session information, a non-unicast service operation type, a non-unicast session operation type, and a non-unicast indication.

Step 112: Send an authentication or authorization message to an application server.

Optionally, the non-unicast indication information further includes at least one of the following: user information, terminal information, and application server information.

The application server information is associated with the application server and includes at least one of the following: an IP address and an application server identifier.

Optionally, the method in this embodiment may further include:

obtaining an authentication and authorization indication from a tenth network function according to the non-unicast indication information; and performing the sending an authentication or authorization message to an application server according to the authentication and authorization indication.

Optionally, the method in this embodiment may further include:

forwarding the authentication or authorization message between the application server and a terminal.

The terminal is associated with the user information, or corresponds to the terminal information.

The following describes this application in detail with reference to specific examples.

Example 1

In this example 1, as shown in FIG. 12, the process corresponding to non-unicast service operation may include the following steps.

Before the following steps, an SMF/I-SMF may store SMF/I-SMF information (such as an identifier, an IP address, or an IP address and port number) and at least one of the following information into a core network function: user information (such as user identifier), terminal information (such as terminal identifier), a PDU session identifier, and a session management context identifier.

The SMF/I-SMF may store the above information into an NEF/MBSF or a UDM, or stores the above information into a UDR through the NEF.

Step 1: [Optional] A content server sends a non-unicast service operation indication to an MB-SMF for a non-unicast service, for example, sending an MB service request; where the request may include a start, restart, stop, and/or update request, and the request may be sent to the MB-SMF via the NEF (MBSF). The request may contain identification information (which may be a plurality of pieces), for example, an IP address, a MAC address, a user identifier, or a terminal identifier. A visited NEF, MBSF, or MB-SMF may obtain user information and/or terminal information from a home NEF (which may be different from the user identifier provided by the content server) based on the identification information, and the home NEF may obtain user information and/or terminal information from the UDR and then sends the information to the visited NEF, MBSF, or MB-SMF.

Step 2: [Optional] An MB-UPF detects arrival of data of the content server or detects no data, where the data is, for example, multicast data Multicast Data.

Step 3: [Optional] The MB-UPF reports data arrival or no data to the MB-SMF. A data arrival report is considered as (re)start of a non-unicast session, and a no-data report is considered as stop of a non-unicast session.

Optionally, in order to prevent the UE from entering a connected state due to too early reception of a (re)start notification and then re-entering an idle state due to no data received, the MB-SMF may not perform subsequent steps before receiving the data arrival report after reception of the (re)start request.

Step 4: [Optional] The MB-SMF performs one or a combination of the following operations:

If a joined member is present for the non-unicast service, when all RAN nodes support the multicast function or all RAN nodes serving non-unicast service or non-unicast session support the non-unicast function, or when non-unicast context information of the MB-SMF contains no SMF/I-SMF information (such as SMF ID or IP address), or contains AMF information (such as AMF ID or IP address), or contains no SMF/I-SMF information, or contains no information of the AMF, the MB-SMF obtains member information, for example, the MB-SMF has its own storage, or obtains it from the UDSF, or obtains it from the NEF. The MB-SMF obtains information about a serving AMF of the members, for example, obtains it from the UDM. The MB-SMF sends to the AMF a non-unicast session operation indication specific to members, for example, sending Namf Communication N1N2MessageTransfer/ Namf Communication NonUeN2MessageTransfer. For example, for a (re)start operation, a multicast establishment indication is sent and used for managing (such as establishing) a non-unicast session shared resource and/or transferring a non-unicast service operation indication. The non-unicast session operation indication includes one or a combination of non-unicast session information (such as an identifier or a non-unicast address), MB-SMF information (such as an identifier or IP address), non-unicast QoS flow information (such as a flow identifier, quality of service requirement, or a standard quality of service index), a non-unicast service operation indication (such as start or restart), and a non-unicast session operation type (such as establishment/modification (update)/release), or may include user information (such as SUPI, GPSI, or GUTI), terminal information (such as IMEI), first indication information, and the like. The first indication is used to indicate information about an AMF operation type (such as a unicast resource-related operation, a non-unicast resource-related operation, or both), or indicate paging being not required or paging being required.

The MB-SMF sends a non-unicast session operation indication to the AMF. For example, for a non-unicast service update operation, a non-unicast session modification indication is sent and used for managing (such as modifying) a non-unicast session shared resource and/or transferring a non-unicast service operation indication. The non-unicast session operation indication includes one or a combination of non-unicast session information, MB-SMF information, non-unicast QoS flow information, a non-unicast service operation indication (such as update/start/stop), and a non-unicast session operation type, or may include first indication information, information about a RAN node or a RAN node list, and the like. The first indication information is used to indicate an AMF update operation type (such as a unicast resource-related operation, a non-unicast resource-related operation, or both), or indicate paging being not required or paging being required.

The MB-SMF sends a non-unicast session operation indication to the AMF, for example, for a non-unicast service stop operation, sending a non-unicast release indication, which is used for managing (such as releasing) a non-unicast session shared resource and/or transferring a non-unicast service operation indication. The non-unicast session operation indication includes one or a combination of non-unicast session information, MB-SMF information, a non-unicast service operation indication, and a non-unicast session operation type, and may also include information about a RAN node or a RAN node list, and the like.

Step 5: [Optional] If not all RAN nodes support the non-unicast function, or when not all RAN nodes serving non-unicast service or non-unicast session support the non-unicast function, or if none of RAN nodes support the non-unicast function, or when none of RAN nodes serving non-unicast service or non-unicast session support the non-unicast function, or when the non-unicast context information of the MB-SMF contains SMF/I-SMF information or contains no AMF information, or contains information of the SMF/I-SMF, or contains no information of the AMF, the MB-SMF obtains an SMF/I-SMF serving the non-unicast session, for example, obtaining it from non-unicast context information locally stored in the MB-SMF, or obtaining one or a combination of SMF/I-SMF information corresponding to the user information and/or terminal information via the UDM or NEF, a PDU session identifier, and a session management context identifier, and for each SMF, one or a combination of the following operations (the MB-SMF and the SMF may be colocated) are performed:

Sending a non-unicast context operation indication to the SMF or I-SMF if a joined member is already present, for example, for a (re)start operation, sending a non-unicast context establishment indication, which is used for managing (for example, establishing) non-unicast session context, where the non-unicast context operation indication includes one or a combination of non-unicast session information, MB-SMF information, non-unicast QoS flow information, a non-unicast service operation indication, a non-unicast session shared resource operation indication, a non-unicast session unicast resource operation indication, and a non-unicast session operation type, and may also include first indication information and the like. The non-unicast session shared resource is used for transmitting non-unicast data in a shared mode (the core network transmits one piece of data to the base station, and the base station transmits the one piece of data to a non-specific number of terminals, which is, for example, zero or one or more). The non-unicast session unicast resource is used for transmitting non-unicast data in an exclusive way (the core network transmits one piece of data to a terminal, and the transmission path passes through the base station). The non-unicast session unicast resource may be used for transmitting non-unicast data or may be prepared for transmitting non-unicast data. The non-unicast context operation indication may also include one or a combination of a session management context identifier, a PDU session identifier, user information, and terminal information.

Sending a non-unicast context operation indication to the SMF or I-SMF, for example, for an update operation, sending a non-unicast context modification indication, which is used for managing (such as modifying) non-unicast session context, where the non-unicast context operation indication includes one or a combination of non-unicast session information, MB-SMF information, non-unicast QoS flow information, a non-unicast service operation indication, and a non-unicast session operation type, and may also include first indication information or the like. If the update operation is used for adding/deleting a user or terminal for non-unicast service and creating/releasing a media resource for the user or terminal, the non-unicast context operation indication may also include one or a combination of a session management context identifier, a PDU session identifier, user information, and terminal information.

Sending a non-unicast context operation indication to the SMF or I-SMF, for example, for a non-unicast service stop operation, sending a non-unicast context release operation indication, which is used for managing (such as releasing) non-unicast session context, where the non-unicast context operation indication includes one or a combination of non-unicast session information, MB-SMF information, non-unicast QoS flow information, a non-unicast service operation indication, a non-unicast session shared resource operation indication, a non-unicast session unicast resource operation indication, and a non-unicast session operation type, and may also include first indication information and the like. The non-unicast context operation indication may also include one or a combination of a session management context identifier, a PDU session identifier, user information, and terminal information.

Step 6: [Optional] The SMF/I-SMF obtains unicast session information related to non-unicast session (such as a PDU session identifier, or a PDU session identifier and a user identifier). The SMF generates unicast QoS flow information based on non-unicast QoS flow information, for example, during generation of the unicast QoS flow information, the unicast session can be further made to additionally support a service of a data flow indicated by the non-unicast QoS flow information or to not additionally support a service capability of the data flow indicated by the non-unicast QoS flow information.

Optionally, for each unicast session or a user related to unicast session, the SMF/I-SMF sends to the AMF a non-unicast session operation indication for managing (such as establishing/releasing) a non-unicast session unicast resource, where the non-unicast session operation indication includes one or a combination of a non-unicast session unicast resource operation indication and a non-unicast session operation type, and may also include user information, terminal information, unicast session information, unicast QoS flow information, the first indication information, and the like. For example, for a non-unicast service (re)start operation, the first indication information may indicate the AMF to page the user.

Optionally, the SMF/I-SMF may alternatively send a non-unicast session operation indication to the AMF for each user, for example, for a non-unicast service (re)start operation, sending a non-unicast session establishment indication for managing (such as establishing) a non-unicast session sharing resource and/or transferring a non-unicast service operation indication, where the non-unicast session operation indication includes one or a combination of non-unicast session information, MB-SMF information, non-unicast QoS flow information, a non-unicast session shared resource operation indication, a non-unicast service operation indication, and a non-unicast session operation type, and may also include user information, terminal information, first indication information, and the like. The non-unicast session operation indication can be sent to the AMF via a call or message. In this case, the non-unicast session shared resource operation indication and the non-unicast session unicast resource operation indication may be combined into one non-unicast session resource operation indication (such as Namf Communication N1N2Message Transfer).

Step 7*a* and step 7*b*: [Optional] When the UE is in an idle state, the AMF sends a paging message to the RAN node, and the RAN node pages the UE. The AMF may perform the operation of sending the paging message based on the first indication information.

Optionally, the AMF may know a non-unicast capability of each RAN node through various non-unicast service operation procedures, for example, in step 13/14/15/16, it is learned that the RAN node supports or does not support the non-unicast capability, such as based on whether non-unicast session-related information (such as non-unicast session information or MB-SMF information) is received. In this way, the operation of sending the paging message can alternatively be performed based on the non-unicast capability of the RAN node. The AMF may alternatively determine, based on the non-unicast capability information of the UE, to send or not send the paging message.

Step 8: The AMF performs one or a combination of the following operations for the non-unicast session operation indication:

The AMF sends a non-unicast session shared resource operation indication to a RAN node or a RAN node list corresponding to RAN node information or RAN node list information contained in the non-unicast session operation indication. The AMF may determine, based on the first indication, to send or not send the non-unicast session shared resource operation indication. The AMF may determine, based on the non-unicast capability of the RAN node and/or the first indication, to send or not send a non-unicast session shared resource operation indication, or send a group paging message (for example, paging one group of UEs or paging one group), or apply a paging policy (for example, if the RAN node returns a failure indication or a time of waiting for a response elapses, the AMF may send a non-unicast session shared resource operation indication or a group paging message to other RAN nodes).

The AMF sends to the RAN node a non-unicast session unicast resource operation indication for a terminal UE corresponding to the terminal information or user information included in the non-unicast session operation indication. The AMF may determine, based on the non-unicast capability of the RAN node and/or the first indication, to send or not send a non-unicast session unicast resource operation indication, or send a group paging message or a single paging message (that is, paging one UE), or apply a paging policy (for example, if the RAN node returns a failure indication or a time of waiting for a response elapses, the AMF may send a non-unicast session unicast resource operation indication, group paging message, or single paging message to other RAN nodes), or determines the foregoing behaviors based on a UE state (such as idle state and connected state). For example, in the idle state, group paging or single paging is sent, or in the connected state, a non-unicast session unicast resource operation indication is sent.

Step 9: [Optional] The RAN node sends a non-unicast operation notification over an air interface, for example, sending a non-unicast start notification for a non-unicast session shared resource establishment indication, and sending a non-unicast stop notification for a non-unicast session shared resource release indication, or sending a paging indication for a paging message.

Step 10: [Optional] If the UE is in the idle state and receives the non-unicast operation notification, the UE may enter the connected state to receive non-unicast resource configuration, for example, sending a service request message. After receiving the paging indication, the UE enters the connected state, for example, sending a service request message.

Step 11: [Optional] If the UE is in the connected state (or has entered the connected state), the AMF sends a non-unicast session unicast resource operation indication to a RAN node serving the UE to associate non-unicast session with unicast resource. If no non-unicast session shared resource operation indication is sent in step 8, the AMF further sends a non-unicast session shared resource operation indication to the RAN node.

Step 12: The RAN node performs one or a combination of the following operations:

The RAN node configures an air interface non-unicast transmission resource, for example, receives a non-unicast session shared resource establishment indication and establishes an air interface non-unicast transmission resource, or receives a non-unicast session shared resource update indication and updates an air interface non-unicast transmission resource, or receives a non-unicast session shared resource release indication and removes a transmission resource related to the non-unicast service.

The RAN node configures an air interface unicast transmission resource, for example, receives a non-unicast session unicast resource operation indication and performs a corresponding operation.

Step 13: [Optional] For the non-unicast session shared resource operation indication, the RAN node sends a non-unicast session shared resource operation response indication to the MB-SMF through the AMF, where the response indication may include user information, terminal information, MB-SMF information, non-unicast session information, RAN node information, and transmission endpoint information (an IP address, an IP address and tunnel identifier, or a tunnel identifier).

Step 14: [Optional] The AMF forwards a non-unicast session shared resource operation response indication to the MB-SMF. The MB-SMF records the RAN node information and/or transmission endpoint information into the non-unicast session context, and/or increases a user plane non-unicast tree path count (for example, adding 1), which is used for managing the user plane non-unicast tree (that is, the above information is the user plane non-unicast tree information in the context), or deletes the RAN node information and/or transmission endpoint information from the non-unicast session context, and/or reduces the user plane non-unicast tree path count (for example, subtracting 1). The MB-SMF may perform the foregoing operation according to a response indication, for example, performs recording if the response indication is a response indication for the non-unicast session shared resource establishment indication, and performs deletion if the response indication is a response indication for a non-unicast session shared resource release indication.

Step 15: [Optional] If receiving a non-unicast session unicast resource operation indication, the RAN node sends to the AMF a non-unicast session unicast resource operation response indication, which may contain non-unicast session information. For example, when the RAN node supports non-unicast function, the non-unicast session information may include an indication indicating node joining or an indication of node leaving, where the indication may be used to indicate a user plane node joining or user plane node leaving indication in the non-unicast session connection operation indication.

Step 16: [Optional] The AMF forwards a non-unicast session unicast resource operation response indication to the SMF/I-SMF.

Step 17: [Optional] If the non-unicast session unicast resource operation response indication is received and the response indication contains non-unicast session information, it is determined to use a shared transmission mode for transmitting non-unicast data; otherwise, it is determined to use a unicast mode for transmitting non-unicast data.

Optionally, the SMF/I-SMF sends to the MB-SMF a non-unicast context operation response indication or a non-unicast context operation indication, such as a non-unicast context update response indication, a non-unicast context release response indication, or a non-unicast context establishment indication, which may include non-unicast session information, a non-unicast session connection operation indication, and the like. The non-unicast session connection operation indication is used for managing a connection operation of a core network node serving the non-unicast session.

Further, in a case that a non-unicast session shared/unicast resource operation response indication sent by the AMF is not received, the SMF sends to the MB-SMF a non-unicast context operation response indication or a non-unicast context operation indication, or sends a non-unicast context operation response indication or a non-unicast context operation indication after all or part of non-unicast session unicast resource operation response indications of unicast sessions being used for transmitting non-unicast data are received. The non-unicast session connection operation indication may indicate or not indicate that the user plane node joins/leaves/stays/does not join/does not leave, and is used for managing the user plane non-unicast tree, that is, a connection to the MB-UPF controlled by the MB-SMF, or may indicate or not indicate that the control plane node joins/leaves/stays/does not join/does not leave, and is used for managing the control plane non-unicast tree, that is, a connection to the MB-SMF. No specific information being contained may also be used to indicate a non-unicast session connection operation indication.

For example, when the UE is the first terminal using the unicast mode and served by the UPF/I-UPF controlled by the SMF/I-SMF, the non-unicast session connection operation indication may indicate that the user plane joins. When the UE is the last terminal using the unicast mode and served by the UPF/I-UPF controlled by the SMF/I-SMF, the non-unicast session connection operation indication may indicate that the user plane leaves. When the UE is the last terminal related to the non-unicast session unicast resource managed by the SMF/I-SMF, the non-unicast session connection operation indication may indicate that the control plane leaves, or not indicate that the control plane leaves, so as to retain part of context information for restarting a non-unicast service operation.

Step 18: [Optional] The MB-SMF configures the MB-UPF to manage a transmission resource of non-unicast data, for example, for a (re)start operation, establishes a transmission resource and starts data transmission; for a stop operation, releases transmission resource and stops data transmission; and for an update operation, updates the transmission resource.

Steps 19*a*, 19*b*, 19*c*, and 19*d*: [Optional] After receiving the non-unicast data, the MB-UPF forwards the non-unicast data through a shared resource and/or unicast resource.

Step 20: The RAN node selects an air interface non-unicast transmission resource and/or air interface unicast transmission resource to forward non-unicast data.

Step 21: The RAN node forwards non-unicast data through the selected air interface resource.

Example 2

In this example 2, as shown in FIG. 13, the process corresponding to non-unicast service operation may include the following steps:

Before the following steps, an SMF/I-SMF may store SMF/I-SMF information (such as an identifier, an IP address, or an IP address and port number) and at least one of the following information into a core network function:

user information, terminal information, a PDU session identifier, and a session management context identifier.

The SMF/I-SMF may store the above information into an NEF/MBSF or a UDM, or stores the above information into a UDR through the NEF.

Step 1: A content server sends a non-unicast service operation indication to an MB-SMF for a non-unicast service, for example, sending an MB service request, such as a session update request, including member information, so as to request for a member update/create/remove resource, where the request may be sent to the MB-SMF via the NEF or MB SF. The request may contain identification information (which may be a plurality of pieces), for example, an IP address, a MAC address, a user identifier, or a terminal identifier. A visited NEF, MB SF, or MB-SMF may obtain user information and/or terminal information from a home NEF (which may be different from the user identifier provided by the content server) based on the identification information, and the home NEF may obtain user information and/or terminal information from the UDR and then sends the information to the visited NEF, MB SF, or MB-SMF.

Step 2: [Optional] When all RAN nodes support non-unicast function, the MB-SMF obtains information about a serving AMF of the user, for example, obtains it from the UDM, and sends, to the AMF for each user, a non-unicast session operation indication (such as establishing/releasing), which is used for managing (such as establishing/updating/releasing) a non-unicast session shared resource and/or transferring a non-unicast service operation indication. The non-unicast session operation indication includes one or a combination of non-unicast session information, MB-SMF information, non-unicast QoS flow information, a non-unicast service operation indication, and a non-unicast session operation type, and may also include user information, terminal information, first indication information, and the like.

Step 3: [Optional] If not all RAN nodes support the non-unicast function, or if none of RAN nodes support the non-unicast function, the MB-SMF obtains an SMF serving the user, for example, obtains it based on information obtained from the UDM, or obtains it locally, or obtains it based on both information (for example, if SMF1 is obtained from the UDM and SMF1 is obtained locally, SMF1 is then selected, or if SMF2 and SMF1 are obtained locally, and SMF2 and SMF1 are related, SMF2 is then selected), or obtains, through the UDM or NEF, one or a combination of SMF/I-SMF information corresponding to user information and/or terminal information, a PDU session identifier, and a session management context identifier, and sends, to each SMF, a non-unicast context operation indication (such as establish/update), which is used for managing non-unicast session context. The non-unicast context operation indication includes one or a combination of non-unicast session information, MB-SMF information, non-unicast QoS flow information, a non-unicast service operation indication, a non-unicast session shared resource operation indication, a non-unicast session unicast resource operation indication, and a non-unicast session operation type, and may also include user information, user list information, a session management context identifier, a PDU session identifier, first indication information, and the like. For each user, the MB-SMF may alternatively send a non-unicast context operation indication to an SMF serving the user, including one or a combination of non-unicast session information, MB-SMF information, non-unicast QoS flow information, a non-unicast service operation indication, a non-unicast session shared resource operation indication, a non-unicast session unicast resource operation indication, and a non-unicast session operation type, and may also include user information, first indication information, and the like.

Step 4: [Optional] The SMF obtains unicast session information related to non-unicast session and user information. The SMF generates unicast QoS flow information based on non-unicast QoS flow information, for example, during generation of the unicast QoS flow information, the unicast session can be further made to additionally support a service of a data flow indicated by the non-unicast QoS flow information or to not additionally support a service capability of the data flow indicated by the non-unicast QoS flow information.

Optionally, for each unicast session or a user related to unicast session, the SMF/I-SMF sends to the AMF a non-unicast session operation indication for managing a non-unicast session unicast resource, where the non-unicast session operation indication includes one or a combination of a non-unicast session unicast resource operation indication and a non-unicast session operation type, and may also include user information, unicast session information, unicast QoS flow information, the first indication information, and the like. For example, for a non-unicast service (re)start operation, the first indication information may indicate the AMF to page the user.

Optionally, for each user, the SMF/I-SMF may alternatively send to the AMF a non-unicast session operation indication (such as Nsmf_Communication_N1N2MessageTransfer), which is used for managing (such as establishing) a non-unicast session shared resource and/or transferring a non-unicast service operation indication. The non-unicast session operation indication includes one or a combination of non-unicast session information, MB-SMF information, non-unicast QoS flow information, a non-unicast session shared resource operation indication, a non-unicast service operation indication, a non-unicast session operation type, and may also include user information, terminal information, user list information, terminal list information, first indication information, and the like.

Step 5: [Optional] When the UE is in the idle state, the AMF may wait until the UE enters the connected state, or pages the UE so that the UE enters the connected state.

Step 6: When the UE is in the connected state (or has entered the connected state), the AMF sends a non-unicast session shared resource operation indication (such as a Multicast Release request) for members to the RAN node serving the UE.

Step 7: [Optional] If the UE is in the connected state (or has entered the connected state), the AMF sends a non-unicast session unicast resource operation indication (such as N2 session request) to the RAN node serving the UE so as to manage (such as establish/update/release) a non-unicast session unicast resource.

Step 8: When the UE is in the connected state, the AMF indicates non-unicast establishment or release to the UE.

Step 9: [Optional] The RAN node configures an air interface transmission resource according to the non-unicast session shared resource operation indication or the non-unicast session unicast resource operation indication.

Step 10: [Optional] The RAN node indicates a non-unicast session shared resource operation response indication (such as Multicast Release response) to the AMF, which may include MB-SMF information, non-unicast session information, RAN node information, transmission endpoint information, and the like.

Step 11: [Optional] The AMF sends a non-unicast session shared resource operation response indication (such as Nsmf_MBSession_ReleaseSMContext) to the MB-SMF. The MB-SMF records the RAN node information and/or transmission endpoint information into the non-unicast session context, and/or increases a path count (for example, adding 1), which is used for managing the user plane non-unicast tree (that is, the above information is the user plane non-unicast tree information in the context), or deletes the RAN node information and/or transmission endpoint information from the non-unicast session context, and/or reduces the path count (for example, subtracting 1). The MB-SMF may perform the foregoing operation according to a response indication, for example, performs recording if the response indication is a response indication for the non-unicast session shared resource establishment indication, and performs deletion if the response indication is a response indication for a non-unicast session shared resource release indication.

Step 12: [Optional] The RAN node sends a non-unicast session unicast resource operation response indication (such as N2 Session Response) to the AMF, which may include unicast session information, non-unicast session information, and the like. If the RAN node supports a non-unicast capability, the non-unicast session information may be included, and the AMF may record the capability of the RAN node. The non-unicast session information may include an indication indicating node joining, or an indication indicating node leaving, and the indication may be used to indicate joining of the user plane node or leaving of the user plane node in the non-unicast session connection operation indication.

Step 13: [Optional] The AMF sends a non-unicast session unicast resource operation response indication to the SMF, for example, sending Nsmf_PDUSession_UpdateSMContext.

Step 14: [Optional] The SMF sends a non-unicast session context operation response indication (such as Nsmf_MB-Session_Release_response) to the MB-SMF, such as a non-unicast context update response indication or a non-unicast context release response indication, which may include non-unicast session information, a non-unicast session connection operation indication, and the like. The non-unicast session connection operation indication is used for managing a connection operation of a core network node serving the non-unicast session. In a case that a non-unicast session shared/unicast resource operation response indication sent by the AMF is not received, the SMF sends to the MB-SMF a non-unicast context operation response indication or a non-unicast context operation indication, or sends a non-unicast context operation response indication or a non-unicast context operation indication after all or part of non-unicast session unicast resource operation response indications of unicast sessions being used for transmitting non-unicast data are received. The non-unicast session connection operation indication may indicate or not indicate that the user plane joins/leaves/stays/does not join/does not leave, and is used for managing the user plane non-unicast tree, that is, a connection to the MB-UPF controlled by the MB-SMF, or may indicate or not indicate that the control plane joins/leaves/stays/does not join/does not leave, and is used for managing the control plane non-unicast tree, that is, a connection to the MB-SMF.

For example, when the UE is the first terminal using the unicast mode and served by the UPF/I-UPF controlled by the SMF/I-SMF, the non-unicast session connection operation indication may indicate that the user plane joins. When the UE is the last terminal using the unicast mode and served by the UPF/I-UPF controlled by the SMF/I-SMF, the non-unicast session connection operation indication may indicate that the user plane leaves. When the UE is the last terminal related to the non-unicast session unicast resource managed by the SMF/I-SMF, the non-unicast session connection operation indication may indicate that the control plane leaves, or not indicate that the control plane leaves, so as to retain part of context information for restarting a non-unicast service operation.

Step 15: [Optional] Based on the response indication, the MB-SMF sends an N4 session modification indication (that is, N4 session modification) to the MB-UPF, and configures that the MB-UPF stops transmitting data to the corresponding UPF (finally being transmitted to the UE through the PDU session), where the stop operation may be based on a non-unicast session connection operation indication.

Example 3

Figure 14:
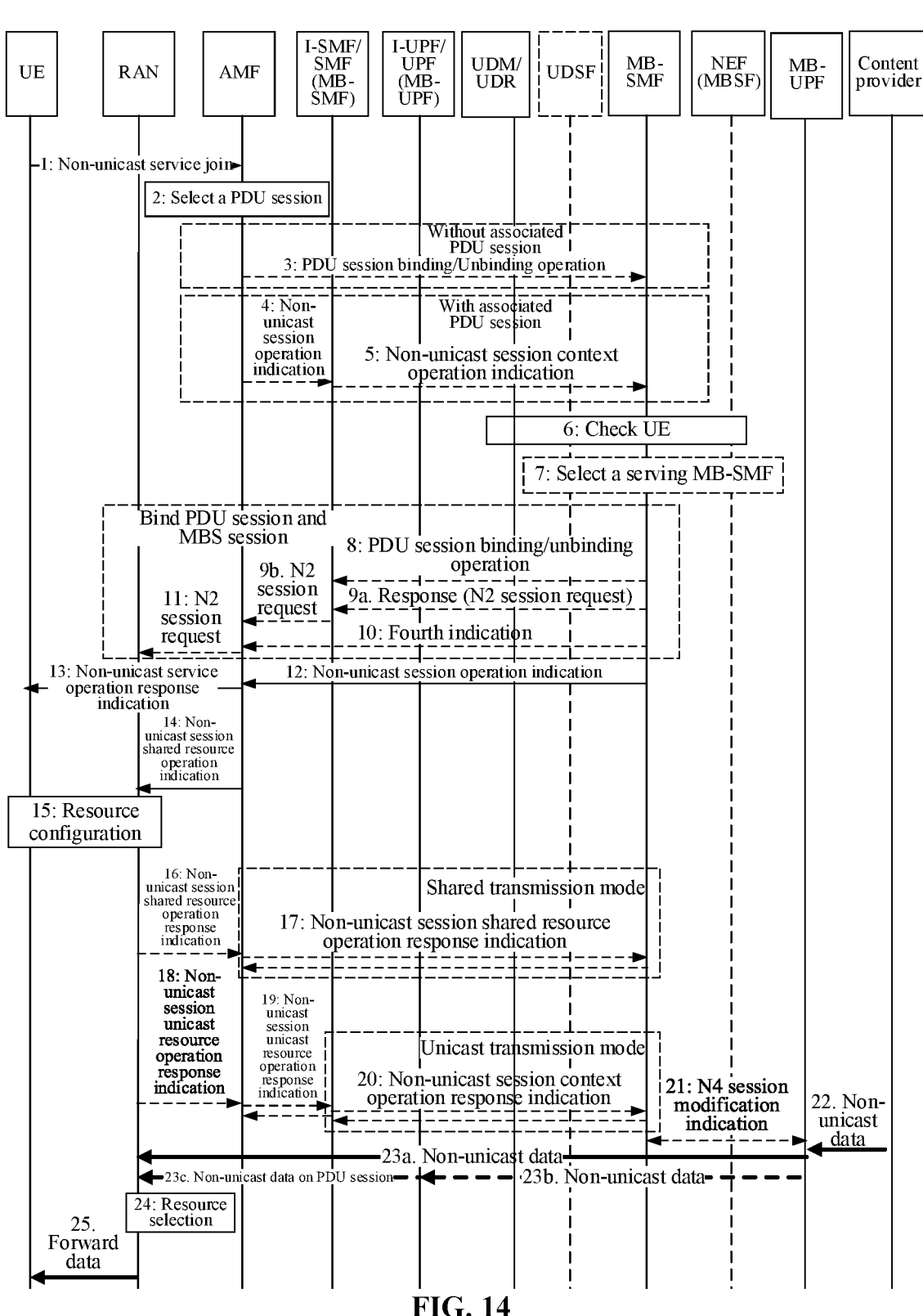
FIG. 14 is a flowchart of a related service operation procedure in example 3 of this application.

In this example 3, as shown in FIG. 14, the process corresponding to non-unicast service operation may include the following steps:

Step 1: The UE sends a non-unicast service operation indication, for example, sending a non-unicast service join-ing (for example, MBS Session Join)/leaving indication, which may include non-unicast session information and non-unicast capability. The non-unicast capability may alter-natively be sent by the UE to the AMF through the regis-tration procedure or activation procedure, for example, using a registration request or service request message.

Step 2: The AMF selects a PDU session that can be associated with multicast operation. The selection may be made based on whether the UE has an associated PDU session of the UE or no associated PDU session. For example, if yes, the associated PDU session is selected; if not, one is selected from PDU sessions of the UE. In addition, based on that all the RAN nodes serving non-unicast service or the RANs serving multicast support the multicast function, or not all of them support the multicast function, or none of them support the multicast function, the AMF may alternatively select a PDU session associated with multicast operation.

Based on whether the UE has an associated PDU session, the AMF may determine to execute step 3 or step 4, for example, execute step 3 if there is no associated PDU session, or execute step 3 if there is an associated PDU session.

Step 3: [Optional] The AMF may select one from the PDU sessions of the UE as a non-unicast associated unicast session. The AMF may alternatively perform selection based on that all the RAN nodes serving non-unicast service or the RAN nodes serving non-unicast support the non-unicast function, or not all of them support the non-unicast function, or none of them support the non-unicast function. The AMF selects the MB-SMF, for example, selects an MB-SMF serving the non-unicast session, and sends to the MB-SMF a non-unicast session operation indication, including second indication information (no specific information being con-tained can also be used as the second indication informa-tion). The second indication information is used to indicate binding/unbinding of unicast session and non-unicast ses-sion, including one or a combination of unicast session information, a non-unicast service operation indication, non-unicast session information, a non-unicast service operation type (such as join/leave), a non-unicast session operation type, and a non-unicast indication, and may also include user information and terminal information. The AMF may per-form the steps based on that the UE has no non-unicast associated unicast session.

The MB-SMF receives the non-unicast session operation indication, and the MB-SMF may send an authentication or authorization request to the AF (for example, sending it to the AF through the MB-UPF) and forwards authorization or authentication messages exchanged between the AF and the UE (for example, through the MB-UPF, MB-SMF, AMF, RAN node, and the like), so as to initiate authorization or authentication for the non-unicast service operation indica-tion to the UE. The MB-SMF may obtain an authentication and authorization indication of the UE, for example, obtain-ing it from the UDM, and performs the above authorization or authentication procedure based on the authentication and authorization indication. The second indication may further include application server information, which may be an IP address or an application server identifier, and the MB-SMF identifies, based on the application server information, an AF to which an authentication or authorization request is sent.

Step 4: [Optional] The AMF sends to the SMF/I-SMF a non-unicast session operation indication (for example, Nsmf_PDUSession_UpdateSMContext), including the sec-ond indication. The AMF may perform the steps based on that the UE has a non-unicast associated unicast session.

The SMF/I-SMF receives the non-unicast session opera-tion indication, and the SMF/I-SMF may send an authenti-cation or authorization request to the AF (for example, sending it to the AF through the UPF) and forwards autho-rization or authentication messages exchanged between the AF and the UE (for example, through the UPF, SMF, AMF, RAN node, and the like), so as to initiate authorization or authentication for the non-unicast service operation indica-tion to the UE. The SMF/I-SMF may obtain an authentica-tion and authorization indication of the UE, for example, obtaining it from the UDM, and performs the above autho-rization or authentication procedure based on the authenti-cation and authorization indication. The second indication may further include application server information, which may be an IP address or an application server identifier, and the SMF/I-SMF identifies, based on the application server information, an AF to which an authentication or authori-zation request is sent.

When the SMF is different from the I-SMF, the I-SMF further sends unicast session related information to the SMF, which includes a session management context identifier and may not include non-unicast session information.

Step 5: [Optional] The SMF sends to the MB-SMF a non-unicast session context operation indication (for example, Nsmf_PDUSession_Create), including the second indication information. If the unicast session is served by multiple SMFs, the associated SMF ID indicates other SMF s serving the unicast session. The SMF may first search for an MB-SMF serving the non-unicast session, and if the search fails, selects one MB-SMF.

Step 6: [Optional] The MB-SMF may check whether the UE has joined the non-unicast session, and if so, stops performing subsequent steps.

The MB-SMF receives the non-unicast session context operation indication, and the MB-SMF may send an authen-tication or authorization request to the AF (for example, sending it to the AF through the MB-UPF) and forwards authorization or authentication messages exchanged between the AF and the UE (for example, through the MB-UPF, MB-SMF, SMF, AMF, RAN node, and the like), so as to initiate authorization or authentication for the non-unicast service operation indication to the UE. The MB-SMF may obtain an authentication and authorization indication of the UE, for example, obtaining it from the UDM, and performs the above authorization or authentica-tion procedure based on the authentication and authorization indication. The second indication may further include appli-cation server information, which may be an IP address or an application server identifier, and the MB-SMF identifies, based on the application server information, an AF to which an authentication or authorization request is to be sent.

Step 7: [Optional] If the MB-SMF does not serve the non-unicast session, searching for an MB-SMF serving the non-unicast session is then performed, and an operation is forwarded to the MB-SMF, such as querying the NEF or UDSF. If there is no MB-SMF serving the non-unicast session (that is, the first UE joins the non-unicast session), the NEF or UDSF returns an ID of the querying network function. If there are multiple MB-SMFs serving the non-unicast session, one may be selected, for example, one close to the UE is selected.

Step 8: [Optional] If all RAN nodes support non-unicast function, this step and steps 9*a* and 9*b* may not be performed. If not all RAN nodes support the non-unicast function, the MB-SMF may send to the SMF/I-SMF a third indication (no specific information being contained may also be used as the third indication) to indicate a cause, for example, the user has joined/the user has not left/the user has left/the user has not joined/a service has started/a service has not started/a service has stopped/a service has not stopped/ the user is not allowed to join/the user is allowed to join/not binding/binding/unbinding/not unbinding, and so on. The SMF/I-SMF binds or unbinds the unicast session and the non-unicast session based on reception of no third indication or based on the third indication. The MB-SMF may record SMF/I-SMF information (such as an identifier or an IP address) into the non-unicast session context so as to manage the control plane non-unicast tree (that is, the above information is information about the control plane non-unicast tree in the context), or removes the SMF/I-SMF information from the non-unicast session context. The MB-SMF may determine, based on whether an SMF/I-SMF is present in the non-unicast session context, to send one or a combination of non-unicast QoS flow information, non-unicast session information, a non-unicast service operation indication, and a non-unicast session operation type.

Step 9*a* and step 9*b*: [Optional] The SMF generates unicast QoS flow information based on non-unicast QoS flow information, for example, during generation of the unicast QoS flow information, the unicast session can be further made to additionally support a service of a data flow indicated by the non-unicast QoS flow information or to not additionally support a service capability of the data flow indicated by the non-unicast QoS flow information. When the SMF is different from the I-SMF, the I-SMF performs the above operations after receiving unicast session related information returned by the SMF.

Optionally, the SMF may send a fourth indication (no specific information being contained may also be used as the fourth indication) to the AMF (which may be through the MB-SMF) to indicate non-unicast association/non-unicast disassociation, which can include one or a combination of a non-unicast session unicast resource operation indication, non-unicast session information, non-unicast service information, a non-unicast session shared resource operation indication, and a non-unicast session operation type. Based on reception of no fourth indication or based on the fourth indication, the AMF associates the unicast session with non-unicast/associates the unicast session with the non-unicast session/disassociates the unicast session from non-unicast/disassociates the unicast session from the non-unicast session.

Step 10: [Optional] The MB-SMF sends a fourth indication (such as Nsmf_PDUSession_CreateSMContext Response) to the AMF.

Step 11: [Optional] The AMF indicates a non-unicast session unicast resource operation to the RAN node.

Step 12: The MB-SMF sends a non-unicast session operation indication to the AMF.

Step 13: The AMF sends to the UE a non-unicast service operation response indication (such as MBS Session Join ACK).

Step 14: The AMF sends a non-unicast session shared resource operation indication (such as a Multicast Create request) to the RAN node.

Step 15: The RAN node configures an air interface transmission resource according to the non-unicast session shared resource operation indication or the non-unicast session unicast resource operation indication.

Step 16: [Optional] The RAN node sends a non-unicast session shared resource operation response indication (such as Multicast Create response) to the AMF, which may include MB-SMF information, non-unicast session information, RAN node information, transmission endpoint information, and the like.

Step 17: [Optional] The AMF sends a non-unicast session shared resource operation response indication (such as Nsmf_MBSession_CreateSMContext) to the MB-SMF. The MB-SMF records the RAN node information and/or transmission endpoint information into the non-unicast session context, and/or increases a user plane non-unicast tree path count (for example, adding 1), which is used for managing the user plane non-unicast tree (that is, the above information is the user plane non-unicast tree information in the context), or deletes the RAN node information and/or transmission endpoint information from the non-unicast session context, and/or reduces the user plane non-unicast tree path count (for example, subtracting 1). The MB-SMF may perform the foregoing operation according to a response indication, for example, performs recording if the response indication is a response indication for the non-unicast session shared resource establishment indication, and performs deletion if the response indication is a response indication for a non-unicast session shared resource release indication. The MB-SMF may alternatively add or remove information about an AMF (such as AMF ID or IP address) serving the RAN node into or from the control plane multicast tree accordingly.

Optionally, the MB-SMF adds RAN node information in the non-unicast session context.

Step 18: [Optional] The RAN node sends a non-unicast session unicast resource operation response indication (such as N2 Session Response) to the AMF, which may include unicast session information, non-unicast session information, and the like. If the RAN node supports a non-unicast capability, the non-unicast session information may be included, and the AMF may record the capability of the RAN node. The non-unicast session information may include an indication indicating node joining, or an indication indicating node leaving, and the indication may be used to indicate joining of the user plane node or leaving of the user plane node in the non-unicast session connection operation indication.

Step 19: [Optional] The AMF sends to the SMF a non-unicast session unicast resource operation response indication (for example, Nsmf_PDUSession_UpdateSMContext).

Step 20: [Optional] The SMF sends a non-unicast session context operation response indication (such as Nsmf_MBSession_Create) to the MB-SMF, such as a non-unicast context update response indication or a non-unicast context release response indication, which may include non-unicast session information, a non-unicast session connection operation indication, and the like. The non-unicast session connection operation indication is used for managing a connection operation of a core network node serving the non-unicast session. In a case that a non-unicast session shared/ unicast resource operation response indication sent by the AMF is not received, the SMF sends to the MB-SMF a non-unicast context operation response indication or a non-unicast context operation indication, or sends a non-unicast context operation response indication or a non-unicast context operation indication after all or part of non-unicast session unicast resource operation response indications of unicast sessions being used for transmitting non-unicast data are received. The non-unicast session connection operation indication may indicate or not indicate that the user plane joins/leaves/stays/does not join/does not leave, and is used for managing the user plane non-unicast tree, that is, a connection to the MB-UPF controlled by the MB-SMF, or may indicate or not indicate that the control plane joins/leaves/stays/does not join/does not leave, and is used for managing the control plane non-unicast tree, that is, a connection to the MB-SMF.

For example, when the UE is the first terminal using the unicast mode and served by the UPF/I-UPF controlled by the SMF/I-SMF, the non-unicast session connection operation indication may indicate that the user plane joins. When the UE is the last terminal using the unicast mode and served by the UPF/I-UPF controlled by the SM/I-SMF, the non-unicast session connection operation indication may indicate that the user plane leaves. When the UE is the last terminal related to the non-unicast session unicast resource managed by the SMF/I-SMF, the non-unicast session connection operation indication may indicate that the control plane leaves, or not indicate that the control plane leaves, so as to retain part of context information for restarting a non-unicast service operation.

Step 21: [Optional] The MB-SMF sends an N4 session modification indication (N4 Session Modification) to the MB-UPF, and configures the MB-UPF to control transmission of non-unicast data, for example, when the first node joins the non-unicast tree, data transmission is started, and when the last node leaves the non-unicast tree, data transmission is stopped.

Step 22: The MB-UPF receives non-unicast data (such as Multicast data).

Steps 23a, 23b, 23c, and 23d: [Optional] After receiving the non-unicast data, the MB-UPF forwards the non-unicast data through a shared resource and/or unicast resource.

Step 24: The RAN node selects an air interface non-unicast transmission resource and/or air interface unicast transmission resource to forward non-unicast data.

Step 25: The RAN node forwards non-unicast data through the selected air interface resource.

Example 4

Figure 15:
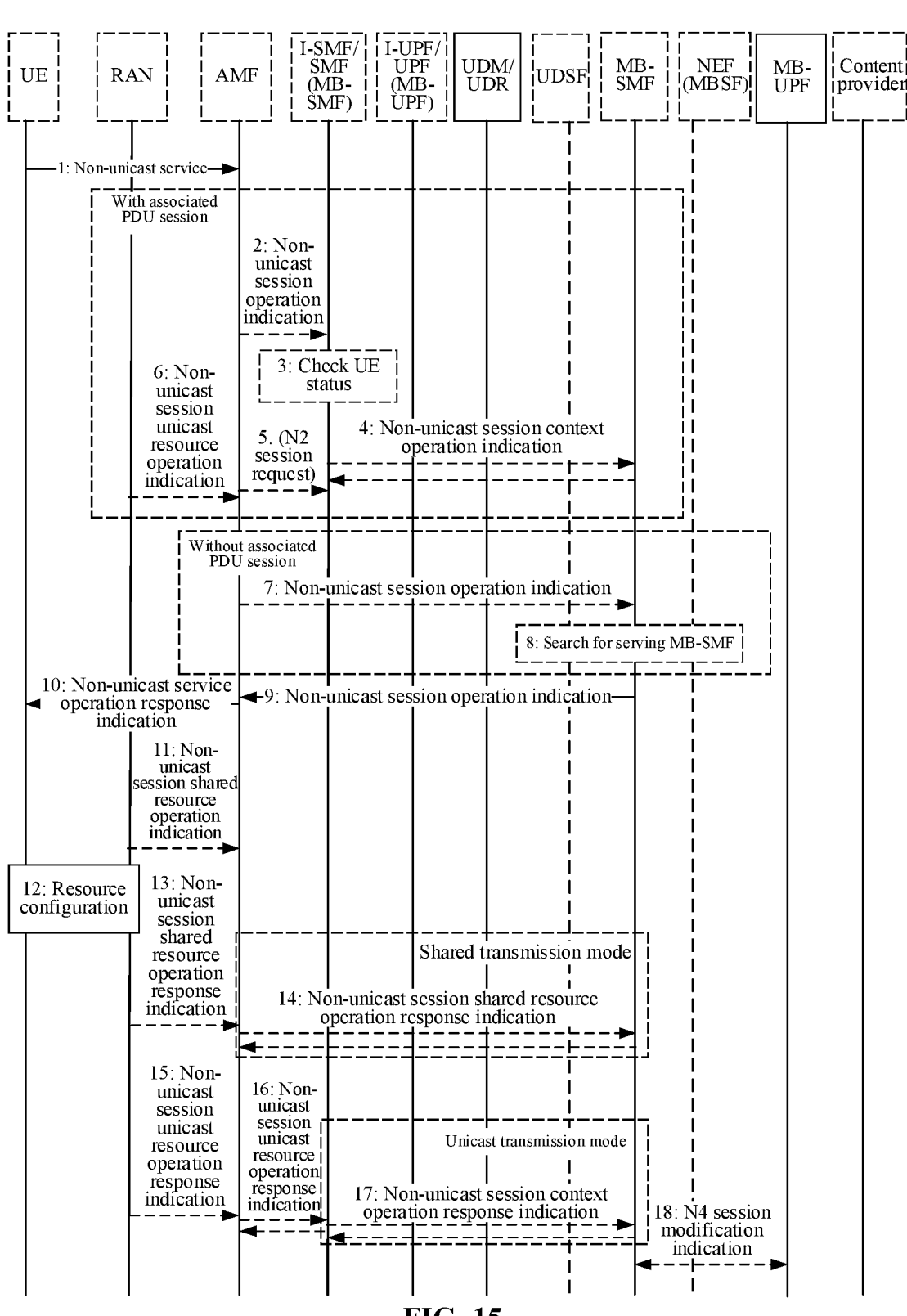
FIG. 15 is a flowchart of a related service operation procedure in example 4 of this application.

In this example 4, as shown in FIG. 15, the processes of triggering a non-unicast service operation may include the following steps:

Step 1: The UE sends a non-unicast service operation indication, for example, sending a non-unicast service joining/leaving (for example, MBS Session Leave) indication, which may include non-unicast session information.

Based on whether the UE has an associated PDU session, the AMF may determine to execute step 2 or step 7, for example, execute step 2 if there is an associated PDU session, or execute step 7 if there is no associated PDU session.

Step 2: [Optional] The AMF sends to the SMF/I-SMF a non-unicast session operation indication (such as Nsmf_P-DUSession_UpdateSMContext), including a second indication, where the second indication is used to indicate binding/unbinding the unicast session and non-unicast session, and including one or a combination of unicast session information and a non-unicast service operation indication, non-unicast session information, a non-unicast service operation type (such as join/leave), and a non-unicast session operation type, and may also include user information and terminal information. The AMF may perform the steps based on that the UE has a non-unicast associated unicast session.

Step 3: [Optional] The SMF/I-SMF may check whether the UE has joined the non-unicast session, and if so, stops performing subsequent steps.

The SMF/I-SMF receives the non-unicast session operation indication, and the SMF/I-SMF may send an authentication or authorization request to the AF (for example, sending it to the AF through the UPF) and forwards authorization or authentication messages exchanged between the AF and the UE (for example, through the UPF, SMF, AMF, RAN node, and the like), so as to initiate authorization or authentication for the non-unicast service operation indication to the UE. The SMF may obtain an authentication and authorization indication of the UE, for example, obtaining it from the UDM, and performs the above authorization or authentication procedure based on the authentication and authorization indication. The second indication may further include application server information, which may be an IP address or an application server identifier, and the SMF identifies, based on the application server information, an AF to which an authentication or authorization request is sent.

When the SMF is different from the I-SMF, the I-SMF further sends unicast session related information to the SMF, which includes a session management context identifier and may not include non-unicast session information.

Step 4: [Optional] The SMF sends to the MB-SMF a non-unicast session context operation indication (for example, Nsmf_PDUSession_Update), including the second indication. If the unicast session is served by multiple SMFs, the associated SMF ID indicates other SMFs serving the unicast session. The SMF may first search for an MB-SMF serving the non-unicast session, and if the search fails, selects one MB-SMF.

The MB-SMF receives the non-unicast session operation indication, and the MB-SMF may send an authentication or authorization request to the AF (for example, sending it to the AF through the MB-UPF) and forwards authorization or authentication messages exchanged between the AF and the UE (for example, through the MB-UPF, MB-SMF, SMF, AMF, RAN node, and the like), so as to initiate authorization or authentication for the non-unicast service operation indication to the UE. The MB-SMF may obtain an authentication and authorization indication of the UE, for example, obtaining it from the UDM, and performs the above authorization or authentication procedure based on the authentication and authorization indication. The second indication may further include application server information, which may be an IP address or an application server identifier, and the MB-SMF identifies, based on the application server information, an AF to which an authentication or authorization request is sent.

Step 5: [Optional] The SMF generates unicast QoS flow information based on non-unicast QoS flow information, for example, during generation of the unicast QoS flow information, the unicast session can be further made to additionally support a service of a data flow indicated by the non-unicast QoS flow information or to not additionally support a service capability of the data flow indicated by the non-unicast QoS flow information. When the SMF is different from the I-SMF, the I-SMF performs the above operations after receiving unicast session related information returned by the SMF.

Optionally, the SMF may send a fourth indication to the AMF (which may be through the MB-SMF) to indicate non-unicast association/non-unicast disassociation, which can include one or a combination of a non-unicast session unicast resource operation indication, non-unicast session information, non-unicast service information, a non-unicast session shared resource operation indication, and a non-unicast session operation type. Based on reception of no fourth indication or based on the fourth indication, the AMF associates the unicast session with non-unicast/associates the unicast session with the non-unicast session/disassociates the unicast session from non-unicast/disassociates the unicast session from the non-unicast session.

Step 6: [Optional] The AMF sends a non-unicast session unicast resource operation indication to the RAN node, for example, sending an N2 Session request.

Step 7: [Optional] The AMF may select one from the PDU sessions of the UE as a non-unicast associated unicast session. The AMF may alternatively perform selection based on that all the RAN nodes serving non-unicast service or the RAN nodes serving non-unicast support the non-unicast function, or not all of them support the non-unicast function, or none of them support the non-unicast function, and/or based on UE capability, for example, the UE does not support non-unicast. The AMF selects the MB-SMF, for example, selects an MB-SMF serving the non-unicast session, and sends to the MB-SMF a non-unicast session operation indication (for example, Nsmf_PDUSession_CreateSMContext (MBS Session Leave)), including second indication information. The second indication information is used to indicate binding/unbinding of unicast session and non-unicast session, including one or a combination of unicast session information, a non-unicast service operation indication, non-unicast session information, a non-unicast service operation type (such as join/leave), and a non-unicast session operation type, and may also include user information and terminal information. The AMF may perform the steps based on that the UE has no non-unicast associated unicast session.

Step 8: [Optional] If the MB-SMF does not serve the non-unicast session, searching for an MB-SMF serving the non-unicast session is then performed, and an operation is forwarded to the MB-SMF. If there are multiple MB-SMFs serving the non-unicast session, one may be selected, for example, one close to the UE is selected.

The MB-SMF receives the non-unicast session operation indication, and the MB-SMF may send an authentication or authorization request to the AF (for example, sending it to the AF through the MB-UPF) and forwards authorization or authentication messages exchanged between the AF and the UE (for example, through the MB-UPF, MB-SMF, AMF, RAN node, and the like), so as to initiate authorization or authentication for the non-unicast service operation indication to the UE. The MB-SMF may obtain an authentication and authorization indication of the UE, for example, obtaining it from the UDM, and performs the above authorization or authentication procedure based on the authentication and authorization indication. The second indication may further include application server information, which may be an IP address or an application server identifier, and the MB-SMF identifies, based on the application server information, an AF to which an authentication or authorization request is sent.

Step 9: The MB-SMF sends to the AMF a non-unicast session operation indication, for example, Nsmf_communication_N1N2MessageTransfer.

Step 10: The AMF sends to the UE a non-unicast service operation response indication, for example, sending an MB S Session Leave ACK.

Step 11: The AMF sends a non-unicast session shared resource operation indication to the RAN node, for example, sending a multicast release request.

Step 12: The RAN node configures an air interface transmission resource according to the non-unicast session shared resource operation indication or the non-unicast session unicast resource operation indication.

Step 13: [Optional] The RAN node indicates a non-unicast session shared resource operation response indication (such as Multicast Release response) to the AMF, which may include MB-SMF information, non-unicast session information, RAN node information, transmission endpoint information, and the like.

Step 14: [Optional] The AMF sends a non-unicast session shared resource operation response indication (such as Nsmf_MBSession_ReleaseSMContext) to the MB-SMF. The MB-SMF records the RAN node information and/or transmission endpoint information into the non-unicast session context, and/or increases a path count (for example, adding 1), which is used for managing the user plane non-unicast tree (that is, the above information is the user plane non-unicast tree information in the context), or deletes the RAN node information and/or transmission endpoint information from the non-unicast session context, and/or reduces the path count (for example, subtracting 1). The MB-SMF may perform the foregoing operation according to a response indication, for example, performs recording if the response indication is a response indication for the non-unicast session shared resource establishment indication, and performs deletion if the response indication is a response indication for a non-unicast session shared resource release indication.

Step 15: [Optional] The RAN node sends a non-unicast session unicast resource operation response indication (such as N2 Session response) to the AMF, which may include unicast session information, non-unicast session information, and the like. If the RAN node supports a non-unicast capability, the non-unicast session information may be included, and the AMF may record the capability of the RAN node. The non-unicast session information may include an indication indicating node joining, or an indication indicating node leaving, and the indication may be used to indicate joining of the user plane node or leaving of the user plane node in the non-unicast session connection operation indication.

Step 16: [Optional] The AMF sends a non-unicast session unicast resource operation response indication to the SMF, for example, sending Nsmf_PDUSession_UpdateSMContext.

Step 17: [Optional] The SMF sends a non-unicast session context operation response indication to the MB-SMF, such as a non-unicast context update response indication or a non-unicast context release response indication, which may include non-unicast session information, a non-unicast session connection operation indication, and the like. The non-unicast session connection operation indication is used for managing a connection operation of a core network node serving the non-unicast session. In a case that a non-unicast session shared/unicast resource operation response indication sent by the AMF is not received, the SMF sends to the MB-SMF a non-unicast context operation response indication or a non-unicast context operation indication, or sends a non-unicast context operation response indication or a non-unicast context operation indication after all or part of non-unicast session unicast resource operation response indications of unicast sessions being used for transmitting non-unicast data are received. The non-unicast session connection operation indication may indicate or not indicate that the user plane joins/leaves/stays/does not join/does not leave, and is used for managing the user plane non-unicast tree, that is, a connection to the MB-UPF controlled by the MB-SMF, or may indicate or not indicate that the control plane joins/leaves/stays/does not join/does not leave, and is used for managing the control plane non-unicast tree, that is, a connection to the MB-SMF. According to the non-unicast session connection operation indication, the MB-SMF increases a user plane non-unicast tree path count (for example, adding 1), or decreases the user plane non-unicast tree path count (for example, subtracting 1), or increases a control plane non-unicast tree path count. Path counting (for example, adding 1), or decreases the control plane non-unicast tree path counting (for example, subtracting 1), or increases and records SMF/I-SMF information or deletes SMF/I-SMF information.

For example, when the UE is the first terminal using the unicast mode and served by the UPF/I-UPF controlled by the SMF/I-SMF, the non-unicast session connection operation indication may indicate that the user plane joins. When the UE is the last terminal using the unicast mode and served by the UPF/I-UPF controlled by the SMF/I-SMF, the non-unicast session connection operation indication may indicate that the user plane leaves. When the UE is the last terminal related to the non-unicast session unicast resource managed by the SMF/I-SMF, the non-unicast session connection operation indication may indicate that the control plane leaves, or not indicate that the control plane leaves, so as to retain part of context information for restarting a non-unicast service operation.

Step 18: [Optional] The MB-SMF initiates an N4 session modification indication (N4 Session Modification), and configures the MB-UPF to control transmission of non-unicast data, for example, when the first node joins the non-unicast tree, data transmission is started, and when the last node leaves the non-unicast tree, the data transmission is stopped.

It should be noted that, according to the method for triggering a non-unicast service operation provided in this embodiment of this application, the execution entity may be an apparatus for triggering a non-unicast service operation, or a control module for performing the method for triggering a non-unicast service operation in the apparatus for triggering a non-unicast service operation. In the embodiments of this application, the method for triggering a non-unicast service operation being performed by the apparatus for triggering a non-unicast service operation is used as an example to describe the apparatus for triggering a non-unicast service operation provided in the embodiments of this application.

Figure 16:
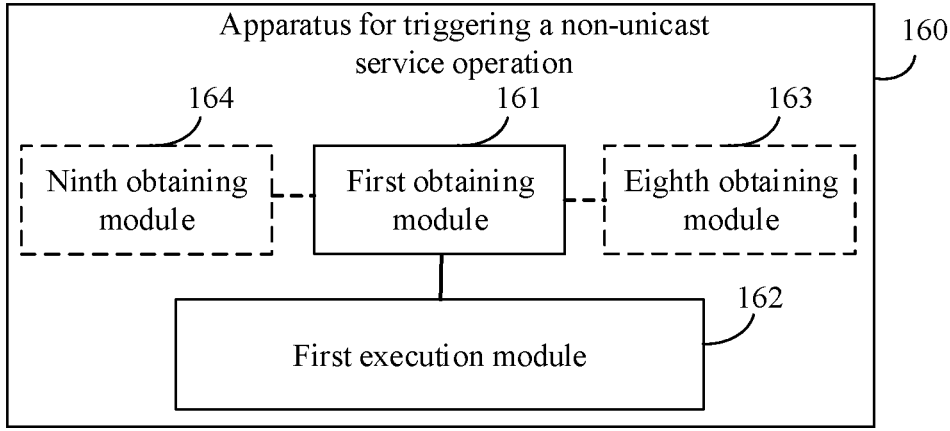
FIG. 16 is a block diagram of an apparatus for triggering a non-unicast service operation according to an embodiment of this application.

Refer to FIG. 16. FIG. 16 is a structural diagram of an apparatus for triggering a non-unicast service operation according to an embodiment of this application, which is applied to a first network function. As shown in FIG. 16, the apparatus 160 for triggering a non-unicast service operation includes:

a first obtaining module 161, configured to obtain non-unicast session information or non-unicast service information; and a first execution module 162, configured to perform a first operation based on the non-unicast session information or the non-unicast service information.

The first operation includes at least one of the following: sending a first non-unicast session operation indication to a second network function; and sending a second non-unicast session operation indication or a non-unicast session context operation indication to a third network function.

The first non-unicast session operation indication includes at least one of the following:

a non-unicast session shared resource operation indication, a non-unicast service operation indication, non-unicast session information, information about the first network function, non-unicast quality of service QoS flow information, and a non-unicast session operation type.

The second non-unicast session operation indication includes at least one of the following:

a non-unicast session shared resource operation indication, a non-unicast service operation indication, a non-unicast session unicast resource operation indication, non-unicast session information, information about the first network function, non-unicast QoS flow information, and a non-unicast session operation type.

The non-unicast session context operation indication includes at least one of the following:

a non-unicast session shared resource operation indication, a non-unicast service operation indication, a non-unicast session unicast resource operation indication, and a non-unicast session connection operation indication.

The non-unicast session shared resource operation indication includes at least one of the following:

a non-unicast session shared resource operation type, a non-unicast service operation indication, non-unicast session information, information about the first network function, non-unicast QoS flow information, and a non-unicast session operation type.

The non-unicast session unicast resource operation indication includes at least one of the following:

a non-unicast session unicast resource operation type, a non-unicast service operation indication, non-unicast session information, information about the first network function, unicast QoS flow information, a non-unicast session operation type, and unicast session information.

The non-unicast includes at least one of the following: multicast and broadcast.

Optionally, the non-unicast session connection operation indication satisfies at least one of the following:

indicating a user plane node to join;
indicating the user plane node to leave;
indicating the user plane node to stay;
indicating the user plane node not to join;
indicating the user plane node not to leave;
without indicating the user plane node to join;
without indicating the user plane node to leave;
without indicating the user plane node to stay;
without indicating the user plane node not to join;
without indicating the user plane node not to leave;
indicating a control plane node to join;
indicating the control plane node to leave;
indicating the control plane node to stay;
indicating the control plane node not to join;
indicating the control plane node not to leave;
without indicating the control plane node to join;
without indicating the control plane node to leave;
without indicating the control plane node to stay;
without indicating the control plane node not to join; and
without indicating the control plane node not to leave.

Optionally, the first execution module 162 is specifically configured to:

perform the first operation based on a RAN capability.

Optionally, the first execution module 162 is specifically configured to perform any one of the following:

performing the first operation based on context information of a non-unicast session corresponding to the non-unicast session information; and performing the first operation based on context information of a non-unicast service corresponding to the non-unicast service information.

Optionally, the first execution module 162 is specifically configured to perform at least one of the following:

in a case that all RAN nodes support a non-unicast function, performing the sending the first non-unicast session operation indication to the second network function;

in a case that all RAN nodes serving non-unicast service or non-unicast session support a non-unicast function, performing the sending the first non-unicast session operation indication to the second network function;

in a case that context information of a non-unicast service or non-unicast session includes no information about a third network function, performing the sending the first non-unicast session operation indication to the second network function;

in a case that the context information of the non-unicast service or non-unicast session includes information about the second network function, sending the first non-unicast session operation indication to the second network function; and in a case that the context information of the non-unicast service or non-unicast session includes the information about the second network function, sending the first non-unicast session operation indication to the third network function.

The non-unicast service corresponds to the non-unicast service information, and the non-unicast session corresponds to the non-unicast session information.

Optionally, the first execution module 162 is specifically configured to perform at least one of the following:

in a case that not all RAN nodes support a non-unicast function, performing the sending a second non-unicast session operation indication or a non-unicast session context operation indication to the third network function;

in a case that not all RAN nodes serving non-unicast service or non-unicast session support a non-unicast function, performing the sending a second non-unicast session operation indication or a non-unicast session context operation indication to the third network function;

in a case that none of RAN nodes support a non-unicast function, performing the sending a second non-unicast session operation indication or a non-unicast session context operation indication to the third network function;

in a case that none of RAN nodes serving non-unicast service or non-unicast session support a non-unicast function, performing the sending a second non-unicast session operation indication or a non-unicast session context operation indication to the third network function;

in a case that context information of a non-unicast service or non-unicast session includes information about the third network function, sending the second non-unicast session operation indication or the non-unicast session context operation indication to the third network function;

in a case that the context information of the non-unicast service or non-unicast session includes no information about the second network function, sending the second non-unicast session operation indication or the non-unicast session context operation indication to the third network function;

in a case that the context information of the non-unicast service or non-unicast session includes the information about the third network function, sending the second non-unicast session operation indication or the non-unicast session context operation indication to the third network function; and in a case that the context information of the non-unicast service or non-unicast session includes information about the second network function, performing the sending a second non-unicast session operation indication or a non-unicast session context operation indication to the third network function.

The non-unicast service corresponds to the non-unicast service information, and the non-unicast session corresponds to the non-unicast session information.

Optionally, the first execution module 162 is further configured to:

perform the sending the first non-unicast session operation indication to the second network function, or sending the first non-unicast session operation indication to the second network function.

Optionally, the first obtaining module 161 is further configured to obtain user information or terminal information.

The first execution module 162 is further configured to: perform the first operation based on context information of a user corresponding to the user information; or perform the first operation based on context information of a terminal corresponding to the terminal information.

Optionally, the first obtaining module 161 is further configured to obtain user information or terminal information.

The first execution module 162 is further configured to perform at least one of the following:

in a case that a user or terminal has no unicast session associated with a non-unicast function, performing the sending the first non-unicast session operation indication to the second network function;

in a case that the user or terminal has no unicast session associated with a non-unicast service, performing the sending the first non-unicast session operation indication to the second network function; and in a case that the user or terminal has no unicast session associated with a non-unicast session, performing the sending the first non-unicast session operation indication to the second network function.

The user corresponds to the user information, and the terminal corresponds to the terminal information; and the non-unicast service corresponds to the non-unicast service information, and the non-unicast session corresponds to the non-unicast session information.

Optionally, the first obtaining module 161 is further configured to obtain user information or terminal information.

The first execution module 162 is further configured to perform at least one of the following:

in a case that a user or terminal has a unicast session associated with the non-unicast function, performing the sending a second non-unicast session operation indication or a non-unicast session context operation indication to a third network function;

in a case that the user or terminal has a unicast session associated with the non-unicast service, performing the sending a second non-unicast session operation indication or a non-unicast session context operation indication to a third network function; and in a case that the user or terminal has a unicast session associated with the non-unicast session, performing the sending a second non-unicast session operation indication or a non-unicast session context operation indication to a third network function.

The user corresponds to the user information, and the terminal corresponds to the terminal information; and the non-unicast service corresponds to the non-unicast service information, and the non-unicast session corresponds to the non-unicast session information.

Optionally, the first execution module 162 is further configured to: perform the sending the first non-unicast session operation indication to the second network function.

Optionally, the first non-unicast session operation indication further includes at least one of the following:

user information, user list information, terminal information, terminal list information, first indication information, RAN node information, RAN node list information, and unicast session information.

the first indication information is used to indicate at least one of the following: non-unicast resource operation type information, paging not required, and paging required; and the non-unicast resource operation type information includes at least one of the following:

shared resource operation and unicast resource operation.

Optionally, the second non-unicast session operation indication further includes at least one of the following:

user information, user list information, terminal information, terminal list information, first indication information, and unicast session information.

The second indication information is used to indicate at least one of the following: non-unicast resource operation type information, paging not required, and paging required; and the non-unicast resource operation type information includes at least one of the following:

shared resource operation and unicast resource operation.

Optionally, the non-unicast service operation indication includes any one of the following: a non-unicast start indication, a non-unicast update indication, a non-unicast stop indication, a non-unicast join indication, and a non-unicast leave indication.

Optionally, the first execution module 162 is further configured to: perform the first operation in a case that a data arrival report is received.

Optionally, the first obtaining module 161 is further configured to: obtain first authorization information, where the first authorization information includes at least one of the following: user non-unicast function authorization information related to operator information, user non-unicast service authorization information related to operator information, and user non-unicast session authorization information related to operator information.

The first execution module 162 is further configured to: perform the first operation based on the first authorization information.

Optionally, the apparatus 160 for triggering a non-unicast service operation further includes an eighth obtaining module.

The eighth obtaining module 163 is configured to obtain information about the third network function and unicast session information from a tenth network function based on user information and/or terminal information.

The unicast session information includes at least one of the following:

a session management context identifier and a PDU session identifier.

Optionally, the apparatus 160 for triggering a non-unicast service operation further includes a ninth obtaining module.

The ninth obtaining module 164 is configured to: before the first operation is performed, obtain user information and/or terminal information from a tenth network function based on identification information.

The identification information includes at least one of the following:

an IP address, a MAC address, a user identifier, and a terminal identifier.

It can be understood that the apparatus 160 for triggering a non-unicast service operation in this embodiment of this application is capable of implementing the processes of the method embodiment shown in FIG. 2, with the same technical effects achieved. To avoid repetition, details are not repeated herein.

Figure 17:
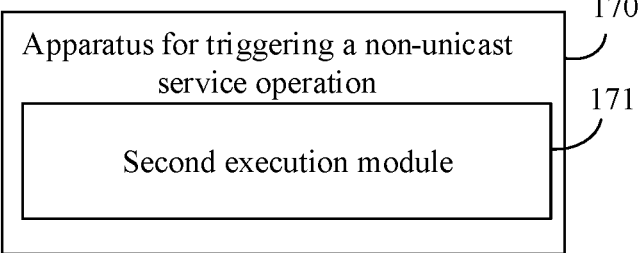
FIG. 17 is a block diagram of another apparatus for triggering a non-unicast service operation according to an embodiment of this application.

Refer to FIG. 17. FIG. 17 is a structural diagram of an apparatus for triggering a non-unicast service operation according to an embodiment of this application, which is applied to a second network function. As shown in FIG. 17, the apparatus 170 for triggering a non-unicast service operation includes:

a second execution module 171, configured to perform a second operation based on at least one of the following:

a non-unicast capability of a first RAN node and first indication information that is received from a first network function.

The second operation includes at least one of the following:

sending a single paging message to the first RAN node, sending a non-unicast session shared resource operation indication to the first RAN node, suspending sending of the non-unicast session shared resource operation indication, sending a non-unicast session unicast resource operation indication to the first RAN node, suspending sending of the non-unicast session unicast resource operation indication, and sending a group paging message to the first RAN node.

The first indication information is used to indicate at least one of the following: non-unicast resource operation type information, paging not required, and paging required; and the non-unicast includes at least one of the following: multicast and broadcast.

Optionally, the second execution module 171 is further configured to: after a failure indication sent by the first RAN node is received or after a response time of the first RAN node expires, send at least one of the following to a second RAN node:

a non-unicast session shared resource operation indication and a non-unicast session unicast resource operation indication.

Optionally, the apparatus 170 for triggering a non-unicast service operation further includes:

a second obtaining module, configured to obtain non-unicast capability information by receiving non-unicast related information from a RAN node.

It can be understood that the apparatus 170 for triggering a non-unicast service operation in this embodiment of this application is capable of implementing the processes of the method embodiment shown in FIG. 3, with the same technical effects achieved. To avoid repetition, details are not repeated herein.

Figure 18:
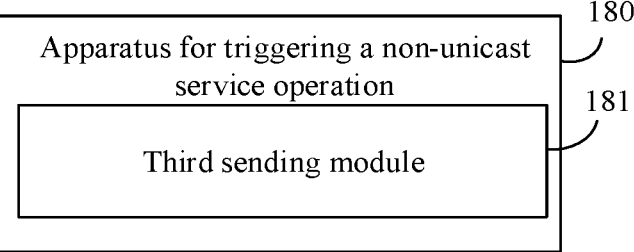
FIG. 18 is a block diagram of another apparatus for triggering a non-unicast service operation according to an embodiment of this application.

Refer to FIG. 18. FIG. 18 is a structural diagram of an apparatus for triggering a non-unicast service operation according to an embodiment of this application, which is applied to a third network function. As shown in FIG. 18, the apparatus 180 for triggering a non-unicast service operation includes:

a third sending module 181, configured to send, to a tenth network function, information about the third network function and at least one of the following:

user information, terminal information, and unicast session information.

The unicast session information includes at least one of the following:

a session management context identifier and a PDU session identifier.

It can be understood that the apparatus 180 for triggering a non-unicast service operation in this embodiment of this application is capable of implementing the processes of the method embodiment shown in FIG. 4, with the same technical effects achieved. To avoid repetition, details are not repeated herein.

Figure 19:
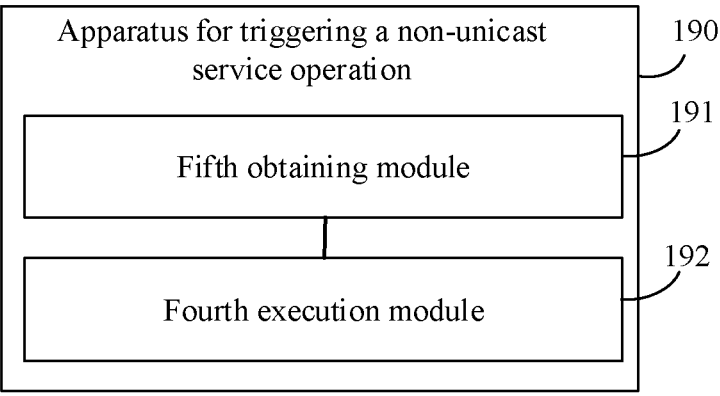
FIG. 19 is a block diagram of another apparatus for triggering a non-unicast service operation according to an embodiment of this application.

Refer to FIG. 19. FIG. 19 is a structural diagram of an apparatus for triggering a non-unicast service operation according to an embodiment of this application, which is applied to an access side network function. As shown in FIG. 19, the apparatus 190 for triggering a non-unicast service operation includes:

a fifth obtaining module 191, configured to obtain a non-unicast session unicast resource operation indication; and a fourth execution module 192, configured to indicate to a core network function at least one of the following: node join and node leave.

It can be understood that the apparatus 190 for triggering a non-unicast service operation in this embodiment of this application is capable of implementing the processes of the method embodiment shown in FIG. 5, with the same technical effects achieved. To avoid repetition, details are not repeated herein.

Figure 20:
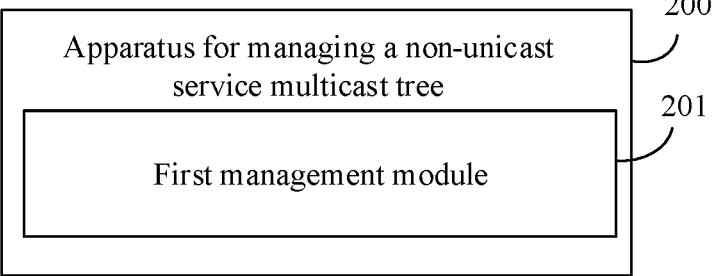
FIG. 20 is a block diagram of an apparatus for managing a non-unicast service multicast tree according to an embodiment of this application.

Refer to FIG. 20. FIG. 20 is a structural diagram of an apparatus for managing a non-unicast service multicast tree according to an embodiment of this application, which is applied to a fourth network function. As shown in FIG. 20, the apparatus 200 for managing a non-unicast service multicast tree includes:

a first management module 201, configured to manage a multicast tree based on at least one of the following:

a non-unicast session connection operation indication, where the non-unicast session connection operation indication is received from a fifth network function;

a RAN capability; and a capability of a RAN node serving non-unicast session or non-unicast service.

The multicast tree includes at least one of the following:

a control plane multicast tree and a user plane multicast tree.

Optionally, the non-unicast session connection operation indication further includes at least one of the following:

a user plane node management indication and a control plane node management indication.

Optionally, the user plane node management indication satisfies at least one of the following:

indicating a user plane node to join;

indicating the user plane node to leave;

indicating the user plane node to stay;

indicating the user plane node not to join;

indicating the user plane node not to leave;

without indicating the user plane node to join;

without indicating the user plane node to leave;

without indicating the user plane node to stay;

without indicating the user plane node not to join;

without indicating the user plane node not to leave;

a non-unicast session shared resource operation indication; and a non-unicast session unicast resource operation indication;

and/or, the control plane node management indication satisfies at least one of the following:

indicating a control plane node to join;

indicating the control plane node to leave;

indicating the control plane node to stay;

indicating the control plane node not to join;

indicating the control plane node not to leave;

without indicating the control plane node to join;

without indicating the control plane node to leave;

without indicating the control plane node to stay;

without indicating the control plane node not to join;

without indicating the control plane node not to leave;

a non-unicast session shared resource operation indication; and a non-unicast session unicast resource operation indication.

Optionally, the apparatus 200 for managing a non-unicast service multicast tree further includes:

a third obtaining module, configured to obtain information about the RAN node; and the first management module 201 is configured to manage a control plane multicast tree; and the managing a control plane multicast tree includes at least one of the following:

adding the information about the RAN node to the control plane multicast tree; and removing the information about the RAN node from the control plane multicast tree.

Optionally, the third obtaining module is further configured to:

obtain information about a transmission endpoint; and

The first management module 201 is configured to manage a user plane multicast tree; and the managing a user plane multicast tree includes at least one of the following:

adding the information about the transmission endpoint to the user plane multicast tree; and removing the information about the transmission endpoint from the user plane multicast tree.

The information about the transmission endpoint includes at least one of the following:

an IP address, a port, tunnel information, and node information.

Optionally, the first management module 201 is configured to manage a user plane multicast tree; and the managing a user plane multicast tree includes at least one of the following:

increasing a user plane node count; and decreasing the user plane node count;

and/or, optionally, the first management module 201 is configured to manage a control plane multicast tree; and the managing a control plane multicast tree includes at least one of the following:

increasing a control plane node count; and decreasing the control plane node count.

Optionally, the first management module 201 is further configured to perform at least one of the following:

managing the user plane multicast tree according to the user plane node management indication;

managing the control plane multicast tree according to the user plane node management indication;

managing the control plane multicast tree according to the control plane node management indication; and managing the user plane multicast tree according to the control plane node management indication.

Optionally, the first management module 201 is configured to manage a control plane multicast tree; and the managing a control plane multicast tree includes at least one of the following:

adding information about the fifth network function to the control plane multicast tree; and removing the information about the fifth network function from the control plane multicast tree.

Optionally, the first management module 201 is further configured to perform at least one of the following:

managing the control plane multicast tree according to the control plane node management indication and information about the fifth network function; and managing the control plane multicast tree according to the user plane node management indication and the information about the fifth network function.

Optionally, the first management module 201 is further configured to perform at least one of the following:

controlling a user plane function to start data transmission; and controlling a user plane function to stop data transmission.

Optionally, the first management module 201 is further configured to further include at least one of the following:

in a case that the first node joins the user plane multicast tree, controlling a user plane function to start data transmission; and in a case that the last node leaves the user plane multicast tree, controlling a control plane function to stop data transmission.

It can be understood that the apparatus 200 for managing a non-unicast service multicast tree in this embodiment of this application is capable of implementing the processes of the method embodiment shown in FIG. 6, with the same technical effects achieved. To avoid repetition, details are not repeated herein.

Figure 21:
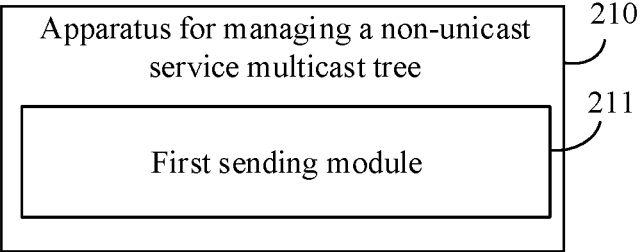
FIG. 21 is a block diagram of another apparatus for managing a non-unicast service multicast tree according to an embodiment of this application.

Refer to FIG. 21. FIG. 21 is a structural diagram of an apparatus for managing a non-unicast service multicast tree according to an embodiment of this application, which is applied to a fifth network function. As shown in FIG. 21, the apparatus 210 for managing a non-unicast service multicast tree includes:

a first sending module 211, configured to send a non-unicast session connection operation indication to a fourth network function based on first information.

The first information includes at least one of the following:

a user plane function controlled by the fifth network function uses a non-unicast session unicast resource to transmit data to the first terminal;

a user plane function controlled by the fifth network function stops using a non-unicast session unicast resource to transmit data to the last terminal;

the fifth network function provides a service to the first terminal or user; and the fifth network function stops providing a service to the last terminal or user.

Optionally, the non-unicast session connection operation indication further includes at least one of the following:

a user plane node management indication and a control plane node management indication.

It can be understood that the apparatus 210 for managing a non-unicast service multicast tree in this embodiment of this application is capable of implementing the processes of the method embodiment shown in FIG. 7, with the same technical effects achieved. To avoid repetition, details are not repeated herein.

Figure 22:
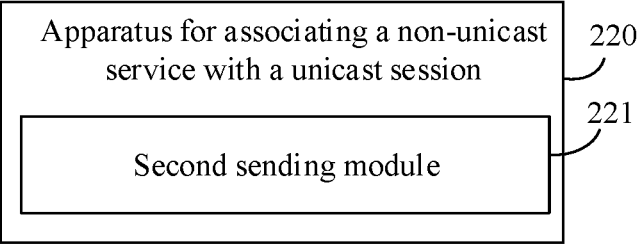
FIG. 22 is a block diagram of an apparatus for associating a non-unicast service with a unicast session according to an embodiment of this application.

Refer to FIG. 22. FIG. 22 is a structural diagram of an apparatus for associating a non-unicast service with a unicast session according to an embodiment of this application, which is applied to a sixth network function. As shown in FIG. 22, the apparatus 220 for associating a non-unicast service with a unicast session includes:

a second sending module 221, configured to send a first operation indication to a seventh network function based on at least one of the following:

a RAN capability, a capability of a RAN node serving non-unicast service or non-unicast session, a first binding indication from the seventh network function, and a second binding indication from an eighth network function.

The first binding indication includes unicast session information and at least one of the following:

a non-unicast service operation indication, non-unicast session information, a non-unicast service operation type, a non-unicast session operation type, and a non-unicast indication.

The second binding indication includes at least one of the following:

a user has joined, the user has not left, the user has left, the user has not joined, a service has started, the service has not started, the service has stopped, the service has not stopped, the user is not allowed to join, the user is allowed to join, not binding, binding, unbinding, and not unbinding.

The first operation indication includes at least one of the following:

an association indication, a disassociation indication, an unassociation indication, and an association retaining indication.

Optionally, the first binding indication further includes at least one of the following:

user information and terminal information.

Optionally, the second sending module 221 is further configured to send at least one of the following to the eighth network function:

non-unicast session unicast resource operation indication, non-unicast session information, non-unicast service information, non-unicast session shared resource operation indication, non-unicast session operation type, unicast session information, user information, and terminal information.

Optionally, the second sending module 221 is further configured to send an unbinding indication to the seventh network function based on at least one of the following:

all RAN nodes support non-unicast, or all RAN nodes serving a non-unicast service or non-unicast session support non-unicast; and a second binding indication of the eighth network function, where the binding indication is at least one of the following: a user has joined, the user has not left, a service has not started, the service has stopped, the user is not allowed to join, not binding, and unbinding.

Optionally, the second sending module 221 is further configured to send a binding indication to the seventh network function based on at least one of the following:

not all RAN nodes support non-unicast, not all RAN nodes serving a non-unicast service or non-unicast session support non-unicast, none of RAN nodes support non-unicast, and none of RAN nodes serving a non-unicast service or non-unicast session support non-unicast; and a second binding indication of the eighth network function, where the binding indication is at least one of the following: a user has not joined, the user has left, a service has started, the service has not stopped, the user is allowed to join, binding, and unbinding.

It can be understood that the apparatus 220 for associating a non-unicast service with a unicast session in this embodiment of this application is capable of implementing the processes of the method embodiment shown in FIG. 8, with the same technical effects achieved. To avoid repetition, details are not repeated herein.

Figure 23:
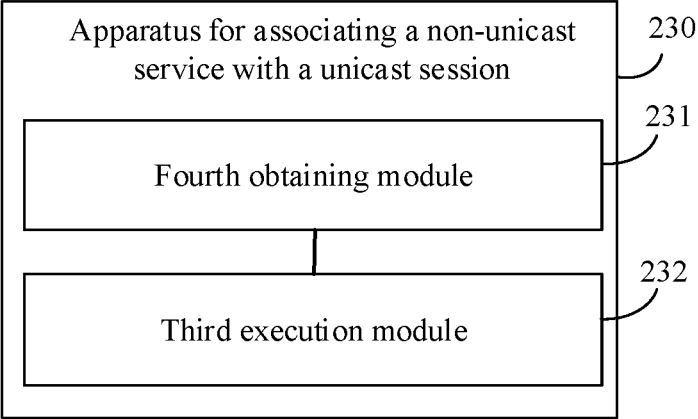
FIG. 23 is a block diagram of another apparatus for associating a non-unicast service with a unicast session according to an embodiment of this application.

Refer to FIG. 23. FIG. 23 is a structural diagram of an apparatus for associating a non-unicast service with a unicast session according to an embodiment of this application, which is applied to a seventh network function. As shown in FIG. 23, the apparatus 230 for associating a non-unicast service with a unicast session includes:

a. a fourth obtaining module 231, configured to obtain a first operation indication of a sixth network function or a second operation indication of an eighth network function; and a third execution module 232, configured to perform at least one of the following according to the first operation indication or the second operation indication:

associating a unicast session with a non-unicast session, associating a unicast session with a non-unicast function, disassociating a unicast session from a non-unicast session, and disassociating a unicast session from a non-unicast function.

The first operation indication includes at least one of the following: an association indication, a disassociation indication, an unassociation indication, and an association retaining indication; and the second operation indication includes at least one of the following: an association indication, a disassociation indication, an unassociation indication, and an association retaining indication.

Optionally, the apparatus 230 for associating a non-unicast service with a unicast session further includes:

a third sending module, configured to send a first binding indication to the sixth network function based on at least one of the following:

terminal capability, RAN capability, and RAN capability for serving a non-unicast service or non-unicast session.

The first binding indication includes unicast session information and at least one of the following:

a non-unicast service operation indication, non-unicast session information, a non-unicast service operation type, a non-unicast session operation type, and a non-unicast indication.

Optionally, the fourth obtaining module 231 is further configured to perform at least one of the following:

obtaining capability information of a terminal; and obtaining capability information of a RAN node.

Optionally, the third sending module is further configured to perform at least one of the following:

in a case that a terminal does not support non-unicast, sending a first binding indication to the sixth network function; and in a case that not all RAN nodes support non-unicast, not all RAN nodes serving a non-unicast service or non-unicast session support non-unicast, none of RAN nodes support non-unicast, or none of RAN nodes serving a non-unicast service or non-unicast session support non-unicast, sending the first binding indication to the sixth network function.

The first binding indication includes unicast session information and at least one of the following:

a non-unicast service operation indication, non-unicast session information, a non-unicast service operation type, a non-unicast session operation type, and a non-unicast indication.

It can be understood that the apparatus 230 for associating a non-unicast service with a unicast session in this embodiment of this application is capable of implementing the processes of the method embodiment shown in FIG. 9, with the same technical effects achieved. To avoid repetition, details are not repeated herein.

Figure 24:
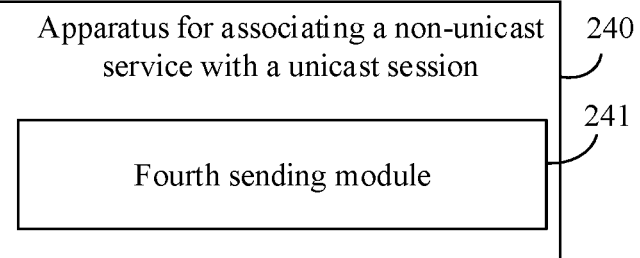
FIG. 24 is a block diagram of another apparatus for associating a non-unicast service with a unicast session according to an embodiment of this application.

Refer to FIG. 24. FIG. 24 is a structural diagram of an apparatus for associating a non-unicast service with a unicast session according to an embodiment of this application, which is applied to an eighth network function. As shown in FIG. 24, the apparatus 240 for associating a non-unicast service with a unicast session includes:

a fourth sending module 241, configured to send a second operation indication to a seventh network function based on at least one of the following:

the terminal or user has a bound non-unicast session or non-unicast service; and the terminal or user has no bound non-unicast session or non-unicast service.

The second operation indication includes at least one of the following: an association indication, a disassociation indication, an unassociation indication, and an association retaining indication.

Optionally, the apparatus 240 for associating a non-unicast service with a unicast session further includes:

a fifth obtaining module, configured to obtain a third binding indication of a sixth network function; and a second management module, configured to manage the non-unicast service or non-unicast session of the terminal according to the third binding indication; or manage the non-unicast service or non-unicast session of the user according to the third binding indication.

The third binding indication includes at least one of the following: a user has joined, the user has not left, a service has not started, the service has stopped, the user is not allowed to join, not binding, and unbinding.

It can be understood that the apparatus 240 for associating a non-unicast service with a unicast session in this embodiment of this application is capable of implementing the processes of the method embodiment shown in FIG. 10, with the same technical effects achieved. To avoid repetition, details are not repeated herein.

Figure 25:
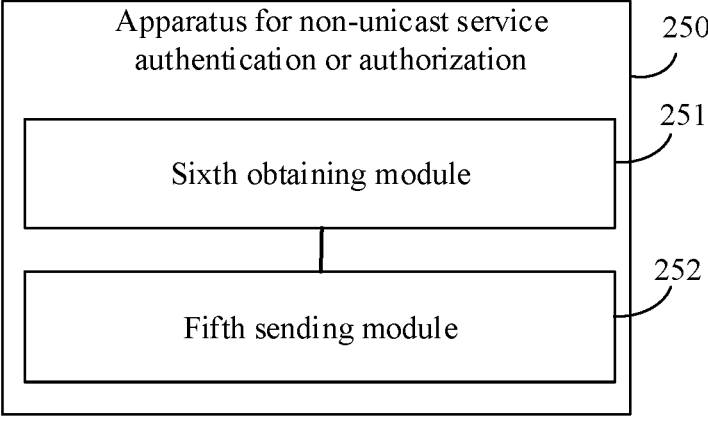
FIG. 25 is a block diagram of an apparatus for non-unicast service authentication or authorization according to an embodiment of this application.

Refer to FIG. 25. FIG. 25 is a structural diagram of an apparatus for non-unicast service authentication or authorization according to an embodiment of this application, which is applied to a ninth network function. As shown in FIG. 25, the apparatus 250 for non-unicast service authentication or authorization includes:

a fifth obtaining module 251, configured to obtain non-unicast indication information; and a fifth sending module 252, configured to send an authentication or authorization message to an application server.

The non-unicast indication information includes at least one of the following: unicast session information and a non-unicast service operation indication, non-unicast session information, a non-unicast service operation type, a non-unicast session operation type, and a non-unicast indication.

Optionally, the apparatus 250 for non-unicast service authentication or authorization further includes:

a seventh obtaining module, configured to obtain an authentication and authorization indication from a tenth network function according to the non-unicast indication information.

The fifth sending module is specifically configured to perform sending of an authentication or authorization message to an application server according to the authentication and authorization indication.

Optionally, the apparatus 250 for non-unicast service authentication or authorization further includes:

a forwarding module, configured to forward the authentication or authorization message between the application server and a terminal.

The terminal is associated with the user information, or corresponds to the terminal information.

It can be understood that the apparatus 250 for non-unicast service authentication or authorization in this embodiment of this application is capable of implementing the processes of the method embodiment shown in FIG. 11, with the same technical effects achieved. To avoid repetition, details are not repeated herein.

Figure 26:
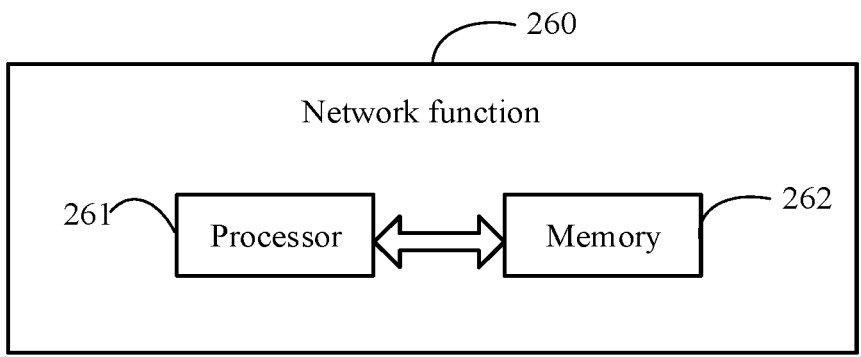
FIG. 26 is a block diagram of a network function according to an embodiment of this application.

Optionally, as shown in FIG. 26, an embodiment of this application further provides a network function 260, including a processor 261, a memory 262, and a program or instructions stored in the memory 262 and capable of running on the processor 261. When the program or the instructions are executed by the processor 261, the processes of the foregoing method embodiments shown in FIG. 2 to FIG. 15 are implemented, with the same technical effects achieved. To avoid repetition, details are not described herein again.

An embodiment of this application further provides a readable storage medium, where a program or instructions are stored in the readable storage medium. When the program or the instructions are executed by a processor, the processes of the foregoing method embodiments shown in FIG. 2 to FIG. 15 are implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions of a network-side device to implement the processes of the foregoing method embodiments shown in FIG. 2 to FIG. 15, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application provides a computer program product, where the program product is stored in a non-volatile storage medium, and the program product is executed by at least one processor to implement the processes of the foregoing method embodiments, with the same technical effects achieved. To avoid repetition, details are not repeated herein.

An embodiment of this application further provides a network function, configured to perform the processes of the foregoing method embodiments, with the same technical effects achieved. To avoid repetition, details are not described herein.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

The invention claimed is:

1. A method for triggering a non-unicast service operation, performed by a first network function, wherein the method comprises:

obtaining non-unicast session information or non-unicast service information; and performing a first operation based on the non-unicast session information or the non-unicast service information; wherein the first operation comprises at least one of the following: sending a first non-unicast session operation indication to a second network function; and sending a second non-unicast session operation indication or a non-unicast session context operation indication to a third network function; wherein the first non-unicast session operation indication comprises at least one of the following:

a non-unicast session shared resource operation indication, a non-unicast service operation indication, non-unicast session information, information about the first network function, non-unicast quality of service QoS flow information, and a non-unicast session operation type; wherein the second non-unicast session operation indication comprises at least one of the following:

a non-unicast session shared resource operation indication, a non-unicast service operation indication, a non-unicast session unicast resource operation indication, non-unicast session information, information about the first network function, non-unicast QoS flow information, and a non-unicast session operation type; wherein the non-unicast session context operation indication comprises at least one of the following:

a non-unicast session shared resource operation indication, a non-unicast service operation indication, a non-unicast session unicast resource operation indication, and a non-unicast session connection operation indication; wherein the non-unicast session shared resource operation indication comprises at least one of the following:

a non-unicast session shared resource operation type, a non-unicast service operation indication, non-unicast session information, information about the first network function, non-unicast QoS flow information, and a non-unicast session operation type; wherein the non-unicast session unicast resource operation indication comprises at least one of the following:

a non-unicast session unicast resource operation type, a non-unicast service operation indication, non-unicast session information, information about the first network function, unicast QoS flow information, a non-unicast session operation type, and unicast session information; wherein the non-unicast comprises at least one of the following: multicast and broadcast.

2. The method according to claim 1, wherein the non-unicast session connection operation indication satisfies at least one of the following:

indicating a user plane node to join;

indicating the user plane node to leave;

indicating the user plane node to stay;

indicating the user plane node not to join;

indicating the user plane node not to leave;

without indicating the user plane node to join;

without indicating the user plane node to leave;

without indicating the user plane node to stay;

without indicating the user plane node not to join;

without indicating the user plane node not to leave;

indicating a control plane node to join;

indicating the control plane node to leave;

indicating the control plane node to stay;

indicating the control plane node not to join;

indicating the control plane node not to leave;

without indicating the control plane node to join;

without indicating the control plane node to leave;

without indicating the control plane node to stay;

without indicating the control plane node not to join; and without indicating the control plane node not to leave, or, the non-unicast service operation indication comprises any one of the following: a non-unicast start indication, a non-unicast update indication, a non-unicast stop indication, a non-unicast join indication, and a non-unicast leave indication.

3. The method according to claim 1, wherein the performing a first operation based on the non-unicast session information or the non-unicast service information comprises:

performing the first operation based on a radio access network RAN capability, and the non-unicast session information or the non-unicast service information; or performing the first operation based on the non-unicast session information or the non-unicast service information, in a case that a data arrival report is received, or, wherein the performing a first operation based on the non-unicast session information or the non-unicast service information comprises any one of the following:

performing the first operation based on context information of a non-unicast session corresponding to the non-unicast session information;

performing the first operation based on context information of a non-unicast service corresponding to the non-unicast service information;

in a case that all RAN nodes support a non-unicast function, performing the sending the first non-unicast session operation indication to the second network function;

in a case that all RAN nodes serving non-unicast service or non-unicast session support a non-unicast function, performing the sending the first non-unicast session operation indication to the second network function;

in a case that context information of a non-unicast service or non-unicast session comprises no information about a third network function, performing the sending the first non-unicast session operation indication to the second network function;

in a case that the context information of the non-unicast service or non-unicast session comprises information about the second network function, sending the first non-unicast session operation indication to the second network function; and in a case that the context information of the non-unicast service or non-unicast session comprises the information about the second network function, sending the first non-unicast session operation indication to the third network function; wherein the non-unicast service corresponds to the non-unicast service information, and the non-unicast session corresponds to the non-unicast session information.

4. The method according to claim 1, wherein the performing a first operation based on the non-unicast session information or the non-unicast service information comprises at least one of the following:

in a case that not all RAN nodes support a non-unicast function, performing the sending a second non-unicast session operation indication or a non-unicast session context operation indication to the third network function;

in a case that not all RAN nodes serving non-unicast service or non-unicast session support a non-unicast function, performing the sending a second non-unicast session operation indication or a non-unicast session context operation indication to the third network function;

in a case that none of RAN nodes support a non-unicast function, performing the sending a second non-unicast session operation indication or a non-unicast session context operation indication to the third network function;

in a case that none of RAN nodes serving non-unicast service or non-unicast session support a non-unicast function, performing the sending a second non-unicast session operation indication or a non-unicast session context operation indication to the third network function;

in a case that context information of a non-unicast service or non-unicast session comprises information about the third network function, sending the second non-unicast session operation indication or the non-unicast session context operation indication to the third network function;

in a case that the context information of the non-unicast service or non-unicast session comprises no information about the second network function, sending the second non-unicast session operation indication or the non-unicast session context operation indication to the third network function;

in a case that the context information of the non-unicast service or non-unicast session comprises the information about the third network function, sending the second non-unicast session operation indication or the non-unicast session context operation indication to the third network function; and in a case that the context information of the non-unicast service or non-unicast session comprises information about the second network function, performing the sending a second non-unicast session operation indication or a non-unicast session context operation indication to the third network function; wherein the non-unicast service corresponds to the non-unicast service information, and the non-unicast session corresponds to the non-unicast session information.

5. The method according to claim 4, wherein the method further comprises:

performing the sending the first non-unicast session operation indication to the second network function, or sending the first non-unicast session operation indication to the second network function.

6. The method according to claim 1, wherein before the performing a first operation, the method further comprises:

obtaining user information or terminal information; and wherein the performing a first operation based on the non-unicast session information or the non-unicast service information comprises at least one of the following:

performing the first operation based on context information of a user corresponding to the user information; or performing the first operation based on context information of a terminal corresponding to the terminal information;

in a case that a user or terminal has no unicast session associated with a non-unicast function, performing the sending the first non-unicast session operation indication to the second network function;

in a case that the user or terminal has no unicast session associated with a non-unicast service, performing the sending the first non-unicast session operation indication to the second network function;

in a case that the user or terminal has no unicast session associated with a non-unicast session, performing the sending the first non-unicast session operation indication to the second network function;

in a case that a user or terminal has a unicast session associated with the non-unicast function, performing the sending a second non-unicast session operation indication or a non-unicast session context operation indication to a third network function;

in a case that the user or terminal has a unicast session associated with the non-unicast service, performing the sending a second non-unicast session operation indication or a non-unicast session context operation indication to a third network function; and in a case that the user or terminal has a unicast session associated with the non-unicast session, performing the sending a second non-unicast session operation indication or a non-unicast session context operation indication to a third network function;

wherein the user corresponds to the user information, and the terminal corresponds to the terminal information; and the non-unicast service corresponds to the non-unicast service information, and the non-unicast session corresponds to the non-unicast session information.

7. The method according to claim 6, wherein the method further comprises:

performing the sending the first non-unicast session operation indication to the second network function.

8. The method according to claim 1, wherein the first non-unicast session operation indication further comprises at least one of the following:

user information, user list information, terminal information, terminal list information, first indication information, RAN node information, RAN node list information, and unicast session information; wherein the first indication information is used to indicate at least one of the following: non-unicast resource operation type information, paging not required, and paging required; and the non-unicast resource operation type information comprises at least one of the following:

shared resource operation and unicast resource operation; and/or, wherein the second non-unicast session operation indication further comprises at least one of the following:

user information, user list information, terminal information, terminal list information, second indication information, and unicast session information; wherein the second indication information is used to indicate at least one of the following: non-unicast resource operation type information, paging not required, and paging required; and the non-unicast resource operation type information comprises at least one of the following:

shared resource operation and unicast resource operation.

9. The method according to claim 1, wherein the method further comprises:

obtaining first authorization information, wherein the first authorization information comprises at least one of the following: user non-unicast function authorization information related to operator information, user non-unicast service authorization information related to operator information, and user non-unicast session authorization information related to operator information; wherein the performing a first operation based on the non-unicast session information or the non-unicast service information further comprises:

performing the first operation based on the first authorization information, and the non-unicast session information or the non-unicast service information;

or, wherein the method further comprises:

obtaining information about the third network function and unicast session information from a tenth network function based on user information and/or terminal information; wherein the unicast session information comprises at least one of the following:

a session management context identifier and a PDU session identifier.

10. The method according to claim 1, before the performing a first operation, further comprising:

obtaining user information and/or terminal information from a tenth network function based on identification information; wherein the identification information comprises at least one of the following:

an IP address, a MAC address, a user identifier, and a terminal identifier.

11. A network function, comprising a processor, a memory, and a program or instructions stored in the memory and capable of running on the processor, wherein the program or the instructions, when executed by the processor, causes the processor to perform the following steps:

obtaining non-unicast session information or non-unicast service information; and performing a first operation based on the non-unicast session information or the non-unicast service information; wherein the first operation comprises at least one of the following:

sending a first non-unicast session operation indication to a second network function; and sending a second non-unicast session operation indication or a non-unicast session context operation indication to a third network function; wherein the first non-unicast session operation indication comprises at least one of the following:

a non-unicast session shared resource operation indication, a non-unicast service operation indication, non-unicast session information, information about the first network function, non-unicast quality of service QoS flow information, and a non-unicast session operation type; wherein the second non-unicast session operation indication comprises at least one of the following:

a non-unicast session shared resource operation indication, a non-unicast service operation indication, a non-unicast session unicast resource operation indication, non-unicast session information, information about the first network function, non-unicast QoS flow information, and a non-unicast session operation type; wherein the non-unicast session context operation indication comprises at least one of the following:

a non-unicast session shared resource operation indication, a non-unicast service operation indication, a non-unicast session unicast resource operation indication, and a non-unicast session connection operation indication; wherein the non-unicast session shared resource operation indication comprises at least one of the following:

a non-unicast session shared resource operation type, a non-unicast service operation indication, non-unicast session information, information about the first network function, non-unicast QoS flow information, and a non-unicast session operation type; wherein the non-unicast session unicast resource operation indication comprises at least one of the following:

a non-unicast session unicast resource operation type, a non-unicast service operation indication, non-unicast session information, information about the first network function, unicast QoS flow information, a non-unicast session operation type, and unicast session information; wherein the non-unicast comprises at least one of the following: multicast and broadcast.

12. The network function according to claim 11, wherein the non-unicast session connection operation indication satisfies at least one of the following:

indicating a user plane node to join;

indicating the user plane node to leave;

indicating the user plane node to stay;

indicating the user plane node not to join;

indicating the user plane node not to leave;

without indicating the user plane node to join;

without indicating the user plane node to leave;

without indicating the user plane node to stay;

without indicating the user plane node not to join;

without indicating the user plane node not to leave;

indicating a control plane node to join;

indicating the control plane node to leave;

indicating the control plane node to stay;

indicating the control plane node not to join;

indicating the control plane node not to leave;

without indicating the control plane node to join;

without indicating the control plane node to leave;

without indicating the control plane node to stay;

without indicating the control plane node not to join; and without indicating the control plane node not to leave, or, the non-unicast service operation indication comprises any one of the following: a non-unicast start indication, a non-unicast update indication, a non-unicast stop indication, a non-unicast join indication, and a non-unicast leave indication.

13. The network function according to claim 11, wherein the performing a first operation based on the non-unicast session information or the non-unicast service information comprises:

performing the first operation based on a radio access network RAN capability, and the non-unicast session information or the non-unicast service information; or performing the first operation based on the non-unicast session information or the non-unicast service information, in a case that a data arrival report is received, or, wherein the performing a first operation based on the non-unicast session information or the non-unicast service information comprises any one of the following:

performing the first operation based on context information of a non-unicast session corresponding to the non-unicast session information; and performing the first operation based on context information of a non-unicast service corresponding to the non-unicast service information;

or, wherein the performing a first operation based on the non-unicast session information or the non-unicast service information comprises at least one of the following:

in a case that all RAN nodes support a non-unicast function, performing the sending the first non-unicast session operation indication to the second network function;

in a case that all RAN nodes serving non-unicast service or non-unicast session support a non-unicast function, performing the sending the first non-unicast session operation indication to the second network function;

in a case that context information of a non-unicast service or non-unicast session comprises no information about a third network function, performing the sending the first non-unicast session operation indication to the second network function;

in a case that the context information of the non-unicast service or non-unicast session comprises information about the second network function, sending the first non-unicast session operation indication to the second network function; and in a case that the context information of the non-unicast service or non-unicast session comprises the information about the second network function, sending the first non-unicast session operation indication to the third network function; wherein the non-unicast service corresponds to the non-unicast service information, and the non-unicast session corresponds to the non-unicast session information.

14. The network function according to claim 11, wherein the performing a first operation based on the non-unicast session information or the non-unicast service information comprises at least one of the following:

in a case that not all RAN nodes support a non-unicast function, performing the sending a second non-unicast session operation indication or a non-unicast session context operation indication to the third network function;

in a case that not all RAN nodes serving non-unicast service or non-unicast session support a non-unicast function, performing the sending a second non-unicast session operation indication or a non-unicast session context operation indication to the third network function;

in a case that none of RAN nodes support a non-unicast function, performing the sending a second non-unicast session operation indication or a non-unicast session context operation indication to the third network function;

in a case that none of RAN nodes serving non-unicast service or non-unicast session support a non-unicast function, performing the sending a second non-unicast session operation indication or a non-unicast session context operation indication to the third network function;

in a case that context information of a non-unicast service or non-unicast session comprises information about the third network function, sending the second non-unicast session operation indication or the non-unicast session context operation indication to the third network function;

in a case that the context information of the non-unicast service or non-unicast session comprises no information about the second network function, sending the second non-unicast session operation indication or the non-unicast session context operation indication to the third network function;

in a case that the context information of the non-unicast service or non-unicast session comprises the information about the third network function, sending the second non-unicast session operation indication or the non-unicast session context operation indication to the third network function; and in a case that the context information of the non-unicast service or non-unicast session comprises information about the second network function, performing the sending a second non-unicast session operation indication or a non-unicast session context operation indication to the third network function; wherein the non-unicast service corresponds to the non-unicast service information, and the non-unicast session corresponds to the non-unicast session information.

15. The network function according to claim 14, wherein the processor is further configured to: perform the sending the first non-unicast session operation indication to the second network function, or sending the first non-unicast session operation indication to the second network function.

16. The network function according to claim 11, wherein the processor is further configured to: obtain user information or terminal information, before the performing a first operation; and wherein the performing a first operation based on the non-unicast session information or the non-unicast service information comprises at least one of the following:

performing the first operation based on context information of a user corresponding to the user information; or performing the first operation based on context information of a terminal corresponding to the terminal information;

in a case that a user or terminal has no unicast session associated with a non-unicast function, performing the sending the first non-unicast session operation indication to the second network function;

in a case that the user or terminal has no unicast session associated with a non-unicast service, performing the sending the first non-unicast session operation indication to the second network function;

in a case that the user or terminal has no unicast session associated with a non-unicast session, performing the sending the first non-unicast session operation indication to the second network function;

in a case that a user or terminal has a unicast session associated with the non-unicast function, performing the sending a second non-unicast session operation indication or a non-unicast session context operation indication to a third network function;

in a case that the user or terminal has a unicast session associated with the non-unicast service, performing the sending a second non-unicast session operation indication or a non-unicast session context operation indication to a third network function; and in a case that the user or terminal has a unicast session associated with the non-unicast session, performing the sending a second non-unicast session operation indication or a non-unicast session context operation indication to a third network function;

wherein the user corresponds to the user information, and the terminal corresponds to the terminal information; and the non-unicast service corresponds to the non-unicast service information, and the non-unicast session corresponds to the non-unicast session information.

17. The network function according to claim 16, wherein the processor is further configured to perform the sending the first non-unicast session operation indication to the second network function.

18. The network function according to claim 11, wherein the first non-unicast session operation indication further comprises at least one of the following:

user information, user list information, terminal information, terminal list information, first indication information, RAN node information, RAN node list information, and unicast session information; wherein the first indication information is used to indicate at least one of the following: non-unicast resource operation type information, paging not required, and paging required; and the non-unicast resource operation type information comprises at least one of the following:

shared resource operation and unicast resource operation; and/or, wherein the second non-unicast session operation indication further comprises at least one of the following:

user information, user list information, terminal information, terminal list information, second indication information, and unicast session information; wherein the second indication information is used to indicate at least one of the following: non-unicast resource operation type information, paging not required, and paging required; and the non-unicast resource operation type information comprises at least one of the following:

shared resource operation and unicast resource operation.

19. The network function according to claim 11, wherein the processor is further configured to:

obtain first authorization information, wherein the first authorization information comprises at least one of the following: user non-unicast function authorization information related to operator information, user non-unicast service authorization information related to operator information, and user non-unicast session authorization information related to operator information; wherein the performing a first operation based on the non-unicast session information or the non-unicast service information further comprises: performing the first operation based on the first authorization information, and the non-unicast session information or the non-unicast service information;

or, wherein the processor is further configured to: obtain information about the third network function and unicast session information from a tenth network function based on user information and/or terminal information; wherein the unicast session information comprises at least one of the following: a session management context identifier and a PDU session identifier.

20. The network function according to claim 11, wherein the processor is further configured to:

before the performing a first operation, obtain user information and/or terminal information from a tenth network function based on identification information; wherein the identification information comprises at least one of the following:

an IP address, a MAC address, a user identifier, and a terminal identifier.

* * * * *